(12) United States Patent
Mehas et al.

(10) Patent No.: US 11,777,339 B2
(45) Date of Patent: Oct. 3, 2023

(54) PWM CONTROL OF ANALOG FRONT END

(71) Applicant: Renesas Electronics America Inc., Milpitas, CA (US)

(72) Inventors: Gustavo James Mehas, Mercer Island, WA (US); Tae Kwang Park, Morgan Hill, CA (US); Giovanni Figliozzi, Zurich (CH)

(73) Assignee: Renesas Electronics America Inc., Milpitas, CA (US)

( * ) Notice: Subject to any disclaimer, the term of this patent is extended or adjusted under 35 U.S.C. 154(b) by 104 days.

(21) Appl. No.: 17/566,991

(22) Filed: Dec. 31, 2021

(65) Prior Publication Data

US 2023/0216342 A1 Jul. 6, 2023

(51) Int. Cl.
*H02J 50/10* (2016.01)
*H02J 50/80* (2016.01)

(52) U.S. Cl.
CPC .............. *H02J 50/10* (2016.02); *H02J 50/80* (2016.02)

(58) Field of Classification Search
CPC .................. H02J 50/10; H02J 50/80

USPC ......................................................... 307/104
See application file for complete search history.

(56) References Cited

U.S. PATENT DOCUMENTS

| 10,033,276 B2 * | 7/2018 | Shenoy ............... H02M 3/1584 |
| 2018/0032096 A1 * | 2/2018 | Beck ..................... H02M 3/158 |
| 2019/0058400 A1 * | 2/2019 | Chieng ................. H02M 3/158 |
| 2019/0140539 A1 * | 5/2019 | Pant .................... H02M 3/1584 |

* cited by examiner

*Primary Examiner* — Alfonso Perez Borroto
(74) *Attorney, Agent, or Firm* — SCULLY, SCOTT, MURPHY & 1 PRESSER, P.C.

(57) ABSTRACT

In an embodiment, a wireless power transmitter is disclosed that includes a first field-effect transistor, a second field-effect transistor a coil and an analog front end. The wireless power transmitter is configured to drive the coil based at least in part on activations of the first and second field-effect transistors. The analog front end includes a first driver corresponding to the first field-effect transistor and being configured to control activation of the first field-effect transistor based at least in part on a pulse-width modulation signal and a second driver corresponding to the second field-effect transistor and being configured to control activation of the second field-effect transistor based at least in part on the pulse-width modulation signal.

20 Claims, 17 Drawing Sheets

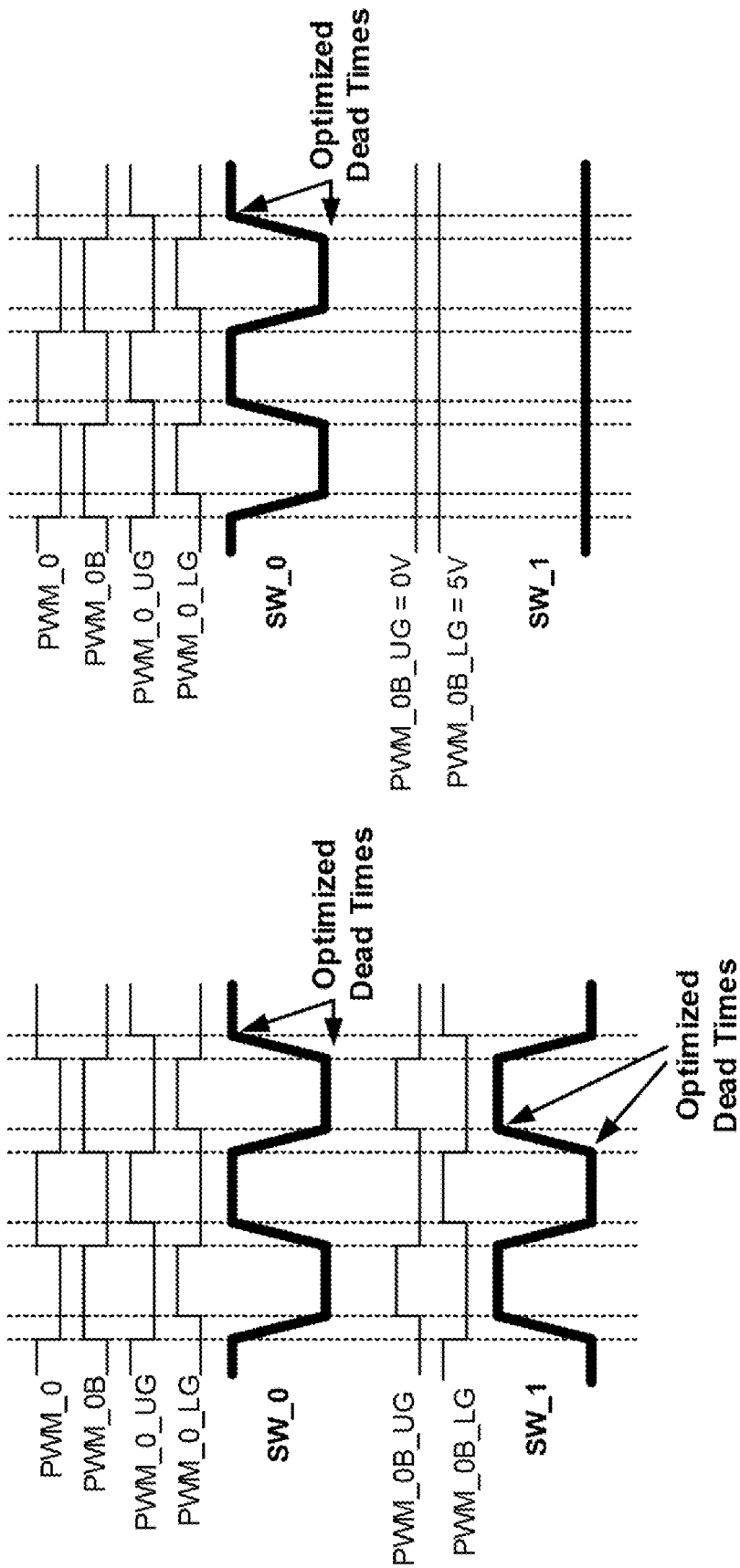

PWM CONTROL OF ANALOG FRONT END

BACKGROUND OF THE SPECIFICATION

The present disclosure relates in general to apparatuses and methods for communication between wireless power transmitters and wireless power receivers.

Wireless power systems often include a transmitter and a receiver having a receiver coil. When a transmission coil of the transmitter and the receiver coil of the receiver are positioned close to one another they form a transformer that facilitates inductive transmission of an alternating current (AC) power between the transmitter and the receiver. The receiver often includes a rectifier circuit that converts the AC power into a direct current (DC) power that may be utilized for various loads or components that require DC power to operate. The transmitter and the receiver also utilize the transformer to exchange information or messages using various modulation schemes. For example, the receiver may include a resonant circuit having one or more capacitors and may switch in or switch out a different number of capacitors of the resonant circuit to generate amplitude shift key (ASK) signals and encode messages in the ASK signals. The receiver can transmit the ASK signals to the transmitter to communicate with the transmitter via the transformer. The transmitter decodes the messages from the ASK signals received from the receiver and encodes response messages in frequency shift key (FSK) signals that may be transmitted back to the receiver via the transformer.

SUMMARY

In an embodiment, a wireless power transmitter is disclosed that comprises a first field-effect transistor, a second field-effect transistor a coil and an analog front end. The wireless power transmitter is configured to drive the coil based at least in part on activations of the first and second field-effect transistors. The analog front end comprises a first driver corresponding to the first field-effect transistor and being configured to control activation of the first field-effect transistor based at least in part on a pulse-width modulation signal and a second driver corresponding to the second field-effect transistor and being configured to control activation of the second field-effect transistor based at least in part on the pulse-width modulation signal.

In another embodiment, a wireless power transmitter is disclosed that comprises a first field-effect transistor, a second field-effect transistor, a third field-effect transistor, a fourth field-effect transistor, a coil and an analog front end. The wireless power transmitter is configured to drive the coil based at least in part on activations of the first, second, third and fourth field-effect transistors. The analog front end comprises a first driver corresponding to the first field-effect transistor and being configured to control activation of the first field-effect transistor and a second driver corresponding to the second field-effect transistor and being configured to control activation of the second field-effect transistor. The analog front end further comprises a third driver corresponding to the third field-effect transistor and being configured to control activation of the third field-effect transistor and a fourth driver corresponding to the fourth field-effect transistor and being configured to control activation of the fourth field-effect transistor. The activation of at least one of the first field-effect transistor and the fourth field-effect transistor is controlled based at least in part on a first pulse-width modulation signal. The activation of at least one of the second field-effect transistor and the third field-effect transistor is controlled based at least in part on a second pulse-width modulation signal.

In another embodiment, a wireless power transmitter is disclosed that comprises a coil, a plurality of field-effect transistors that are configured to drive the coil, an analog front end that is configured to control activations of the plurality of field-effect transistors and a controller that is configured to provide an unencoded pulse-width modulation signal to the analog front end. The analog front end is configured to control the activation of at least one of the field-effect transistors based at least in part on the unencoded pulse-width modulation signal.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

BRIEF DESCRIPTION OF THE DRAWINGS

FIG. 4 is a diagram of example waveforms of the AFE of FIG. 3 in a full-bridge mode according to an embodiment.

FIG. 5 is a diagram of example waveforms of the AFE of FIG. 3 in a half-bridge mode according to an embodiment.

DETAILED DESCRIPTION

Figure 1:
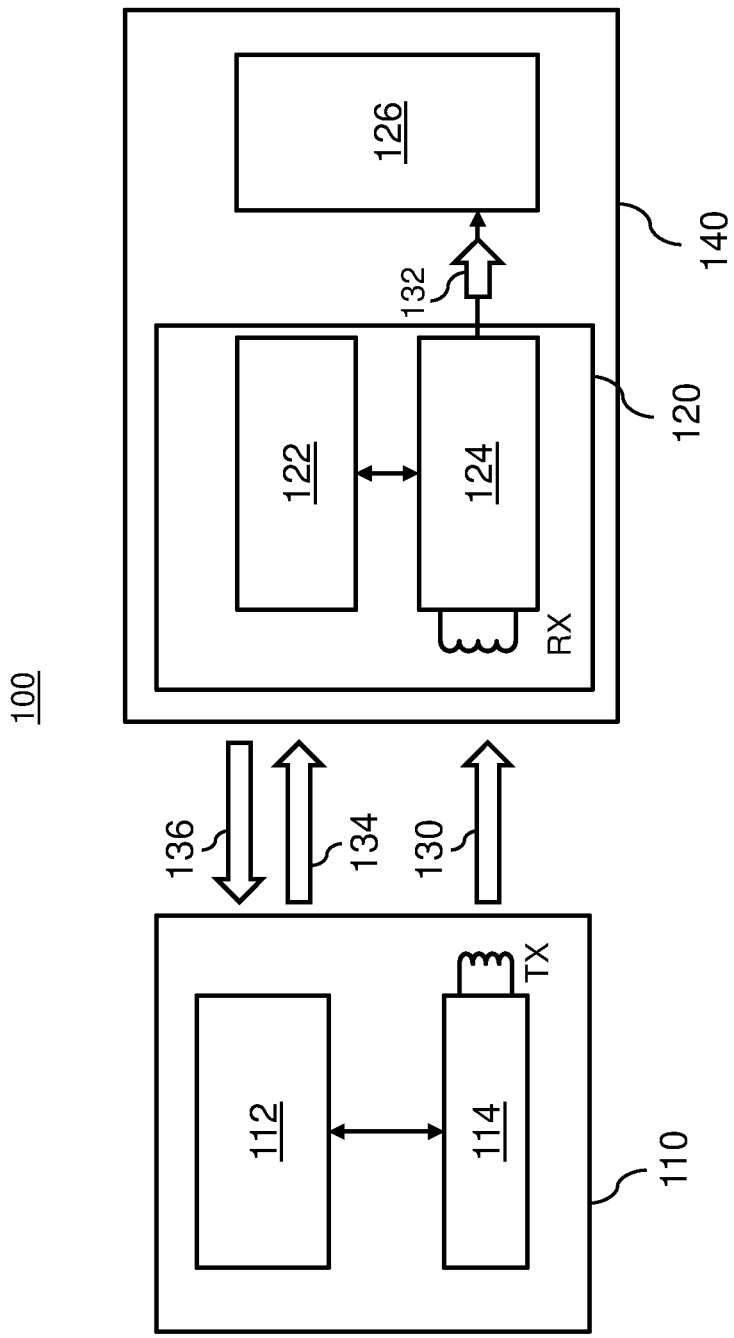
FIG. 1 is a block diagram of an example system for wireless power transfer according to an embodiment.

FIG. 1 is a diagram showing an example system 100 that implements wireless power transfer and communication according to an illustrative embodiment. System 100 comprises a transmitter 110 and a receiver 120 that are configured to wirelessly transfer power and data therebetween via inductive coupling. While described herein as transmitter 110 and receiver 120, each of transmitter 110 and receiver 120 may be configured to both transmit and receive power or data therebetween via inductive coupling.

Transmitter 110 is configured to receive power from one or more power supplies 116 (FIG. 2) and to transmit AC power to receiver 120 wirelessly. For example, transmitter 110 may be configured for connection to a power supply 116 such as, e.g., an AC power supply or a DC power supply. Transmitter 110 comprises a controller 112 and a power driver 114.

Controller 112 is configured to control and operate power driver 114. Controller 112 comprises, for example, a processor, central processing unit (CPU), field-programmable gate array (FPGA) or any other circuitry that is configured to control and operate power driver 114. While described as a CPU in illustrative embodiments, controller 112 is not limited to a CPU in these embodiments and may comprise any other circuitry that is configured to control and operate power driver 114. In an example embodiment, controller 112 is configured to control power driver 114 to drive a coil TX of the power driver 114 to produce a magnetic field. Power driver 114 is configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards.

Receiver 120 is configured to receive AC power transmitted from transmitter 110 and to supply the power to one or more loads 126 or other components of a destination device 140. Destination device 140 may comprise, for example, a computing device, mobile device, mobile telephone, smart device, tablet, wearable device or any other electronic device that is configured to receive power wirelessly. In an illustrative embodiment, destination device 140 comprises receiver 120. In other embodiments, receiver 120 may be separate from destination device 140 and connected to destination device 140 via a wire or other component that is configured to provide power to destination device 140.

Receiver 120 comprises a controller 122 and a power rectifier 124. Controller 122 comprises, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. Power rectifier 124 is configured to rectify AC power received from coil RX into DC power which may then be supplied to load 126.

As an example, when receiver 120 is placed in proximity to transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126. Load 126 may comprise, for example, a battery charger that is configured to charge a battery of the destination device 140, a DC-DC converter that is configured to supply power to a processor, a display, or other electronic components of the destination device 140, or any other load of the destination device 140.

Transmitter 110 and receiver 120 are also configured to exchange information or data, e.g., messages, via the inductive coupling of power driver 114 and power rectifier 124. For example, before transmitter 110 begins transferring power to receiver 120, a power contract may be agreed upon and created between receiver 120 and transmitter 110. For example, receiver 120 may send communication packets or other data to transmitter 110 that indicate power transfer information such as, e.g., an amount of power to be transferred to receiver 120, commands to increase, decrease, or maintain a power level of AC power 130, commands to stop a power transfer, or other power transfer information. In another example, in response to receiver 120 being brought in proximity to transmitter 110, e.g., close enough such that a transformer may be formed by coil TX and coil RX to facilitate power transfer, receiver 120 may be configured to initiate communication by sending a signal to transmitter 110 that requests a power transfer. In such a case, transmitter 110 may respond to the request by receiver 120 by establishing the power contract or beginning power transfer to receiver 120, e.g., if the power contract is already in place.

Transmitter 110 and receiver 120 may transmit and receive communication packets, data or other information via the inductive coupling of coil TX and coil RX. As an example, communication packet sent from transmitter 110 to receiver 120 may comprise frequency shift key (FSK) signals 134. FSK signals 134 are frequency modulated signals that represent digital data using variations in the frequency of a carrier wave. Communication packets sent from receiver 120 to transmitter 110 may comprise amplitude shift key (ASK) signals 136. ASK signals 136 are amplitude modulated signals that represent digital data using variations in the amplitude of a carrier wave. While transmitter 110 is described as sending FSK signals 134 and receiver 120 is described as sending ASK signals 136, in other embodiments, receiver 120 may alternatively send FSK signals and transmitter 110 may alternatively send ASK signals. Any other manner of transmitting communication packets, data or other information between transmitter 110 and receiver 120 may alternatively be used.

Figure 2:
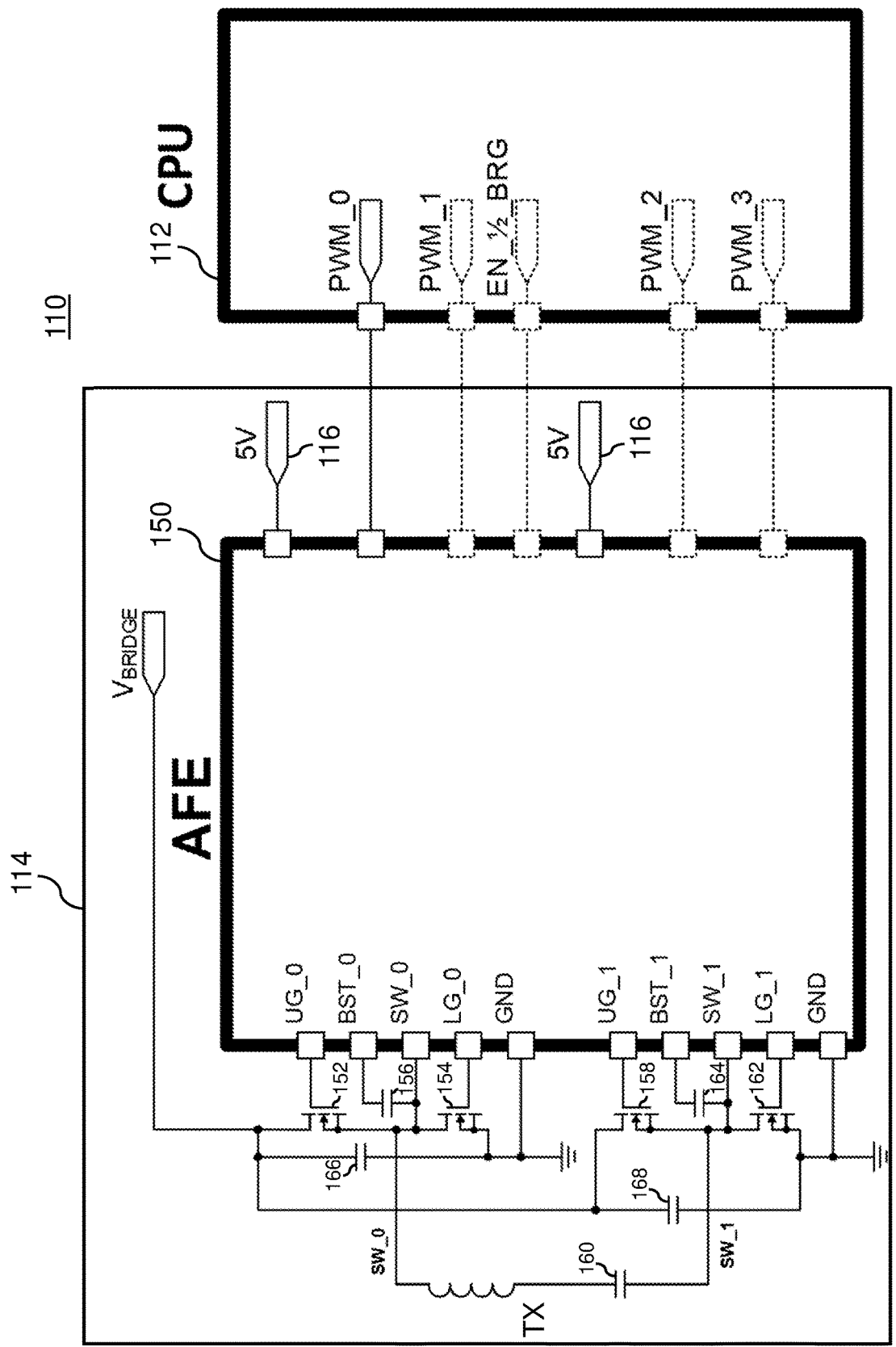
FIG. 2 is a circuit diagram illustrating an example transmitter of the system of FIG. 1 according to an embodiment.

Referring now to FIG. 2, transmitter 110 according to an illustrative embodiment will be described in more detail. As seen in FIG. 2, controller 112, e.g., a CPU, of the transmitter 110 communicates with an analog front-end (AFE) 150 of the power driver 114 using one or more signals such as, e.g., pulse-width modulation (PWM) signals or other signals, to control and operate power driver 114 to provide power or data using coil TX. As an example, controller 112 may be configured to supply one, two, three, four or any other number of PWM signals to AFE 150 for controlling and operating power driver 114. For example, controller 112 may be configured to supply one or more of PWM signals PWM_0, PWM_1, PWM_2 and PWM_3 or other PWM signals to AFE 150. In some embodiments, controller 112 may also be configured to provide a half bridge enable signal, EN_½_BRG, to AFE 150 that is configured to enable or disable half-bridge operation. In an illustrative embodiment, the PWM signals are not encoded by the controller 112 and decoded by the AFE 150 but instead are provided as-is to the AFE 150. In other embodiments, the PWM signals may alternatively be encoded by the controller 112 and decoded by the AFE 150.

AFE 150 is configured to receive the one or more of the PWM signals, e.g., PWM_0, PWM_1, PWM_2 and PWM_3, other signals such as, e.g., EN_½_BRG, and power supplies 116 and to generate outputs signals UG_0, BST_0, LG_0, UG_1, BST_1 and LG_1. Outputs signals UG_0, BST_0, and LG_0 correspond to a top half-bridge of the power driver 114 and outputs signals UG_1, BST_1, and LG_1 correspond to a bottom half-bridge of the power driver 114. UG_0 is connected to the gate of a metal-oxide-semiconductor field-effect transistor (MOSFET) 152 of power driver 114 and controls the activation of MOSFET 152. When MOSFET 152 is activated, the source/drain of MOSFET 152 connects a bridge power supply, $V_{BRIDGE}$, to an output SW_0 which is connected to a first side of coil TX.

LG_0 is connected to the gate of a MOSFET 154 of power driver 114 and controls the activation of MOSFET 154. When MOSFET 154 is activated, the source/drain of MOSFET 154 connects SW_0 to ground.

Figure 3:
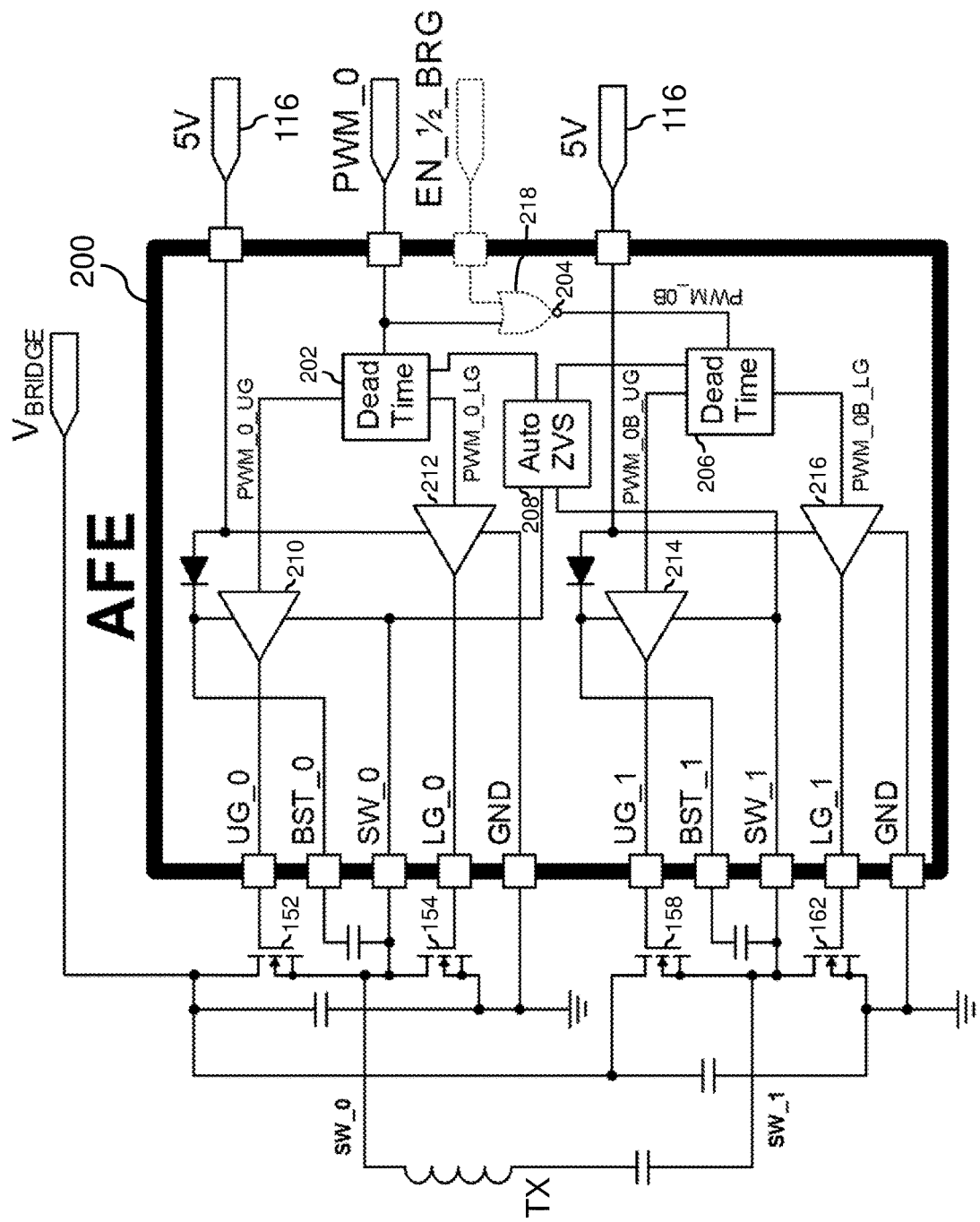
FIG. 3 is a circuit diagram illustrating an example analog front end (AFE) of the transmitter of FIG. 2 according to an embodiment.

BST_0, which is connected through AFE 150 to one of power supplies 116 via a diode, for example, as shown in FIG. 3, is connected to one side of a capacitor 156. The other side of capacitor 156 is connected to SW_0 such that the capacitor is charged and discharged according to the activations of UG_0 and LG_0. In some embodiments, BST_0 acts as a floating power supply to provide $V_{BRIDGE}$+5V to power the UG_0 signal.

UG_1 is connected to the MOSFET 158 of power driver 114 and controls the activation of MOSFET 158. When MOSFET 158 is activated, the source/drain of MOSFET 158 connects $V_{BRIDGE}$ to an output SW_1 which is connected to a second side of coil TX via a capacitor 160.

LG_1 is connected to the gate of a MOSFET 162 of power driver 114 and controls the activation of MOSFET 162. When MOSFET 162 is activated, the source/drain of MOSFET 162 connects SW_1 to ground.

BST_1, which is connected through AFE 150 to one of power supplies 116 via a diode, for example, as shown in FIG. 3, is connected to one side of a capacitor 164. The other side of capacitor 164 is connected to SW_1 such that the capacitor is charged and discharged according to the activations of UG_1 and LG_1. In some embodiments, BST_1 acts as a floating power supply to provide $V_{BRIDGE+}$5V to power the UG_1 signal.

Power driver 114 also comprises a capacitor 166 disposed between VBRIDGE and ground in parallel with the drain of MOSFET 154 and a capacitor 168 disposed between VBRIDGE and ground in parallel with the drain of MOSFET 162.

AFE 150 also has connections to ground (GND) for each half-bridge and has connections to SW_0 and SW_1 for monitoring and feedback.

MOSFETS 152, 154, 158 and 162 and capacitors 156, 160, 164, 166 and 168 are together configured to control outputs SW_0 and SW_1 to drive coil TX to generate a magnetic field according one or more of the PWM signals, e.g., PWM_0, PWM_1, PWM_2 and PWM_3, received by AFE 150 for providing power or data inductively to another device such as, e.g., receiver 120 (FIG. 1). While an example configuration of MOSFETs and capacitors is shown in FIG. 2 and the following figures, any other configuration of MOSFETs and capacitors may alternatively be utilized to drive coil TX.

Example embodiments of AFE 150 will now be described with reference to FIGS. 3-21.

Referring now to FIG. 3, an example AFE 200 according to an embodiment of AFE 150 will now be described. AFE 200 receives power supplies 116, e.g., 5V power supplies or other voltages, and a single PWM signal PWM_0 as inputs. PWM_0 is fed to a dead time circuit 202 of the top half bridge of the AFE 200. PWM_0 is also inverted by an inverter 204 and the inverted signal PWM_0B is fed to a dead time circuit 206 of a bottom half bridge of the AFE 200.

Dead time circuit 202 receives PWM_0 as an input signal and is configured to delay the rising edges of corresponding output signals PWM_0_UG and PWM_0_LG according to a signal received from an automatic zero-voltage switching (ZVS) circuit 208. PWM_0_LG is inverted relative to PWM_0 by dead time circuit 202 with a delayed rising edge. PWM_0_UG feeds into a MOSFET driver 210 which outputs to UG_0 to control the activation of MOSFET 152. PWM_0_LG feeds into a MOSFET driver 212 which outputs to LG_0 to control the activation of MOSFET 154.

For example, as shown in FIG. 4, the rising edge of PWM_0_UG is delayed relative to PWM_0 to coincide with the end of the dead time of SW_0 during the transition from low to high such that the rising edge of PWM_0_UG occurs when SW_0 is high and no longer transitioning. Similarly, the rising edge of PWM_0_LG is delayed relative to the inversion of PWM_0 to coincide with the end of the dead time of SW_0 during the transition from high to low such that the rising edge of PWM_0_LG occurs when SW_0 is low and no longer transitioning.

Dead time circuit 206 receives PWM_0B as an input signal and is configured to delay the rising edges of corresponding output signals PWM_0B_UG and PWM_0B_LG according to a signal received from ZVS circuit 208. PWM_0B_LG is inverted relative to PWM_0B by dead time circuit 206 with a delayed rising edge. PWM_0B_UG feeds into a MOSFET driver 214 which outputs to UG_1 to control the activation of MOSFET 152. PWM_0B_LG feeds into a MOSFET driver 216 which outputs to LG_1 to control the activation of MOSFET 154.

For example, as shown in FIG. 4, the rising edge of PWM_0B_UG is delayed relative to PWM_0B to coincide with the end of the dead time of SW_1 during the transition from low to high such that the rising edge of PWM_0B_UG occurs when SW_1 is high and no longer transitioning. Similarly, the rising edge of PWM_0B_LG is delayed relative to the inversion of PWM_0B to coincide with the end of the dead time of SW_1 during the transition from high to low such that the rising edge of PWM_0B_LG occurs when SW_1 is low and no longer transitioning.

ZVS circuit 208 is configured to monitor feedback from SW_0 and SW_1 and to indicate to dead time circuits 202 and 206 when the corresponding output, SW_0 or SW_1, is high, low or transitioning. In some embodiments, controller 112 may alternatively control the dead time circuits 202 and 206 instead of ZVS circuit 208 or based on feedback from ZVS circuit 208. ZVS circuit 208 is configured to cause dead time circuits 202 and 206 to delay the rising edges of the output signals based on a servo feed-back loop that detects specific voltages of SW_0 and SW_1 which fall in a region between the final voltage and the voltage clamped by the body diodes of the MOSFETs. The function of ZVS circuit 208 will be described in more detail below with reference to FIGS. 16-21.

As shown in FIG. 4, for example, PWM_0_UG and PWM_0_LG alternate between low and high with their respective rising and falling edges being spaced apart to optimize the dead times of SW_0. Similarly, PWM_0B_UG and PWM_0B_LG alternate between low and high with their respective rising and falling edges being spaced apart to optimize the dead times of SW_1. FIG. 4 shows a 50% duty cycle with 180-degree phase shift between SW_0 and SW_1, e.g., due to the inversion of PWM_0. Any other duty cycle may alternatively be used.

While dead time circuits 202 and 206 are described as delaying the rising edges of the corresponding signals, in some embodiments, one or both of dead time circuits 202 and 206 may alternatively be utilized to delay the falling edges of the corresponding signals in some embodiments.

In some embodiments AFE 200 also receives EN_½_BRG from controller 112. EN_½_BRG feeds into an OR gate 218 located prior to inverter 204 along with PWM_0 such that, when EN_½_BRG is enabled, the bottom half-bridge of AFE 200 is disabled, e.g., because the output of inverter 204 will always be low, and SW_1 will always be low as shown, for example in FIG. 5. When EN_½_BRG is disabled, the bottom half-bridge of AFE 200 is enabled with PWM_0 being inverted to PWM_0B by inverter 204 to drive SW_1, e.g., as shown in FIG. 4.

The configuration of AFE 200 allows controller 112 to control and operate power driver 114 using a single PWM signal, e.g., PWM_0, for both full-bridge and half-bridge operations. The single PWM signal may be provided to AFE 200 from controller 112 using a single pin of the controller 112. The single PWM signal also allows controller 112 to control the frequency of the power output from coil TX for FSK messaging. Full-bridge operation of power driver 114 is enabled by inverting the PWM signal to provide a 180-degree phase shift between SW_0 and SW_1 and dead time circuits 202 and 206 and ZVS 208 are utilized to automatically control the dead time optimization of SW_0 and SW_1. The use of the EN_½_BRG signal allows controller 112 to enable and disable the half-bridge mode of operation independently of the single PWM signal.

Figure 6:
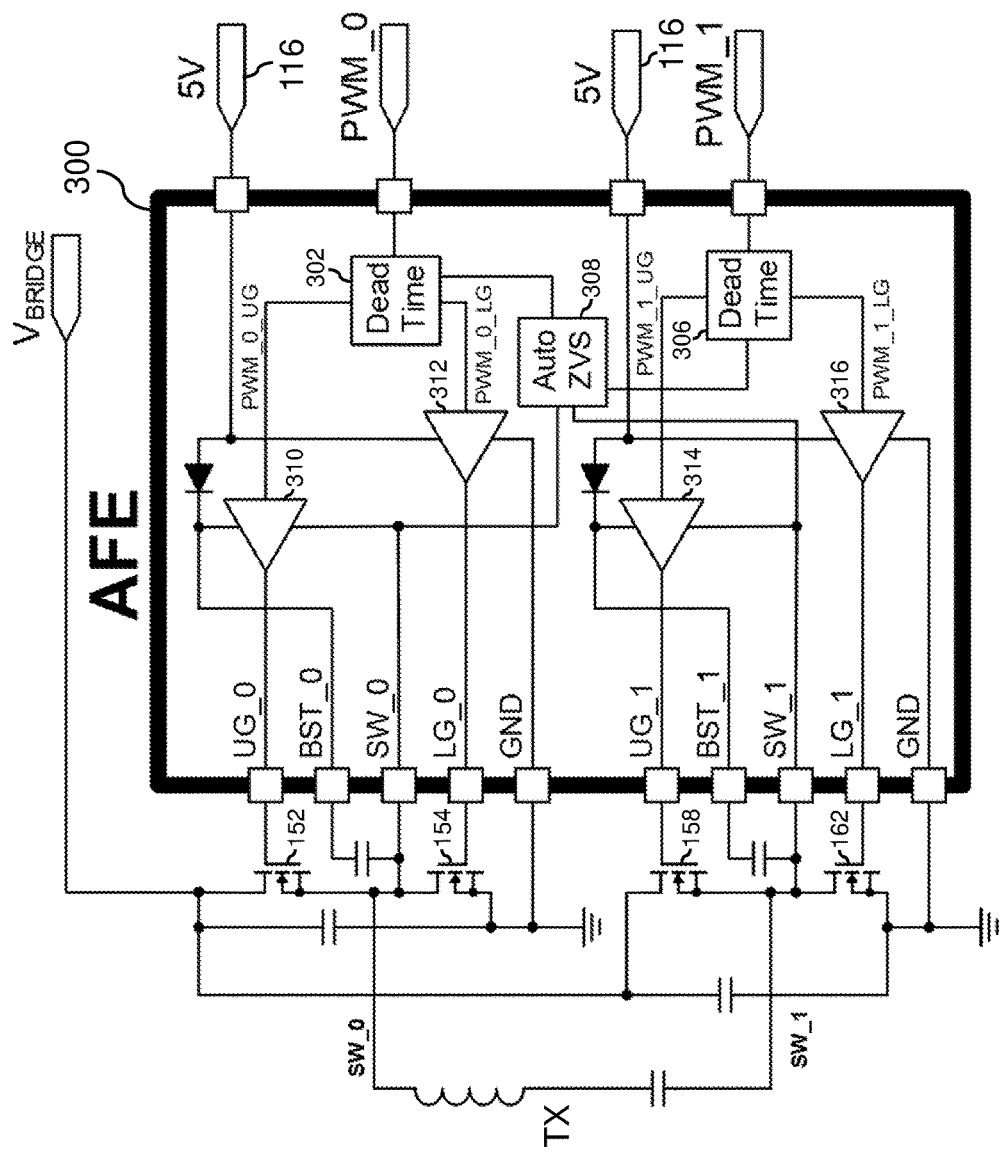
FIG. 6 is a circuit diagram illustrating an example AFE of the transmitter of FIG. 2 according to another embodiment.

Referring now to FIG. 6, an example AFE 300 according to an embodiment of AFE 150 will now be described. AFE 300 includes similar components to AFE 200 where like components have similar reference numbers and are configured to operate in a similar manner. In this embodiment, AFE 300 receives two PWM signals, PWM_0 and PWM_1, as inputs instead of a single PWM signal. PWM_0 is fed to dead time circuit 302 of the top half bridge of the AFE 300 in a similar manner to AFE 200. PWM_1 is fed to a dead time circuit 306 of a bottom half bridge of the AFE 300 in this embodiment.

Dead time circuit 302 receives PWM_0 as an input signal and is configured to delay the rising edges of corresponding output signals PWM_0_UG and PWM_0_LG according to a signal received from a ZVS circuit 308 in a similar manner to that described above for AFE 200 to control MOSFETs 152 and 154 of power driver 114. PWM_0_LG is inverted relative to PWM_0 by dead time circuit 302 with a delayed rising edge. PWM_0_UG feeds into a MOSFET driver 310 which outputs to UG_0 to control the activation of MOSFET 152. PWM_0_LG feeds into a MOSFET driver 312 which outputs to LG_0 to control the activation of MOSFET 154.

Figure 7:
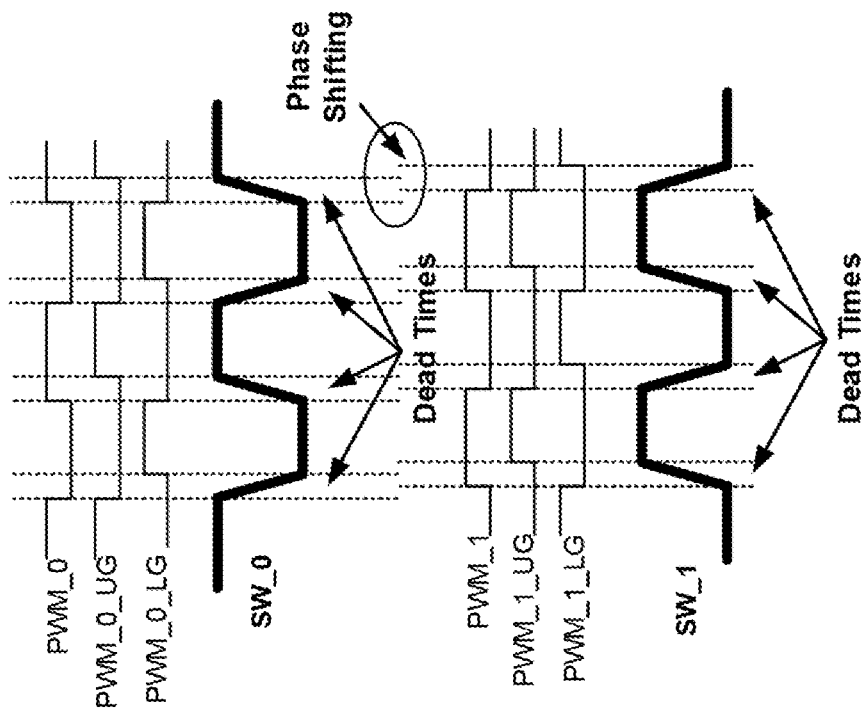
FIG. 7 is a diagram of example waveforms of the AFE of FIG. 6 in a full-bridge mode according to an embodiment.

For example, as shown in FIG. 7, the rising edge of PWM_0_UG is delayed relative to PWM_0 to coincide with the end of the dead time of SW_0 during the transition from low to high such that the rising edge of PWM_0_UG occurs when SW_0 is high and no longer transitioning. Similarly, the rising edge of PWM_0_LG is delayed relative to the inversion of PWM_0 to coincide with the end of the dead time of SW_0 during the transition from high to low such that the rising edge of PWM_0_LG occurs when SW_0 is low and no longer transitioning.

Dead time circuit 306 receives PWM_1 as an input signal and is configured to delay the rising edges of corresponding output signals PWM_1_UG and PWM_1_LG according to a signal received from ZVS circuit 308. PWM_1_LG is inverted relative to PWM_1 by dead time circuit 306 with a delayed rising edge. PWM_1_UG feeds into a MOSFET driver 314 which outputs to UG_1 to control the activation of MOSFET 152. PWM_1_LG feeds into a MOSFET driver 316 which outputs to LG_1 to control the activation of MOSFET 154.

For example, as shown in FIG. 7, the rising edge of PWM_1_UG is delayed relative to PWM_1 to coincide with the end of the dead time of SW_1 during the transition from low to high such that the rising edge of PWM_1_UG occurs when SW_1 is high and no longer transitioning. Similarly, the rising edge of PWM_1_LG is delayed relative to the inversion of PWM_1 to coincide with the end of the dead time of SW_1 during the transition from high to low such that the rising edge of PWM_1_LG occurs when SW_1 is low and no longer transitioning.

As shown in FIG. 7, for example, PWM_0_UG and PWM_0_LG alternate between low and high with their respective rising and falling edges being spaced apart to optimize the dead times of SW_0. Similarly, PWM_1_UG and PWM_1_LG alternate between low and high with their respective rising and falling edges being spaced apart to optimize the dead times of SW_1. FIG. 7 shows a 50% duty cycle with a phase shift between SW_0 and SW_1 that is not limited to only 180 degrees. Any other duty cycle or phase shift may alternatively be used, e.g., by adjusting PWM_0 and PWM_1 respectively.

Figure 8:
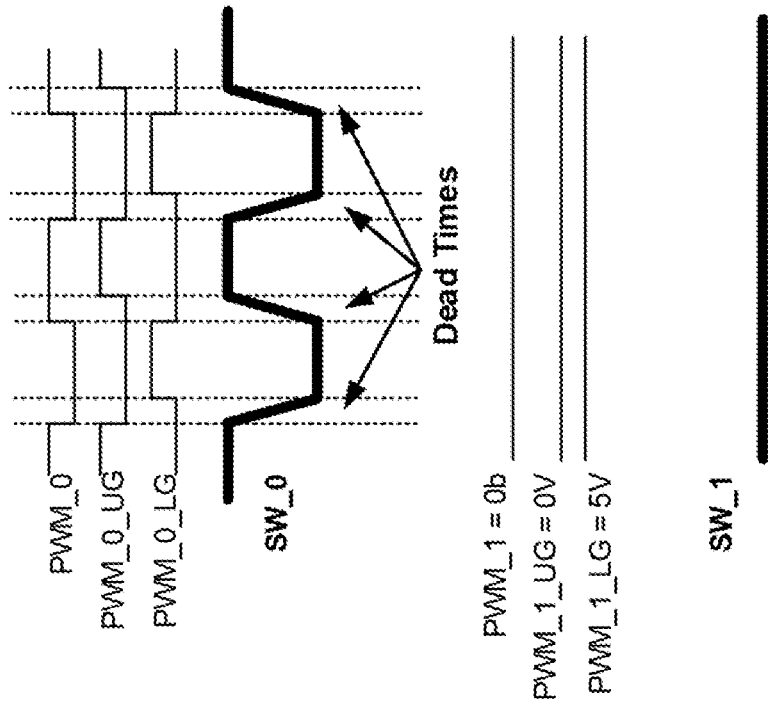
FIG. 8 is a diagram of example waveforms of the AFE of FIG. 6 in a half-bridge mode according to an embodiment.

In this embodiment, controller 112 is configured to enable or disable each half-bridge of AFE 300 using PWM_0 and PWM_1 respectively. For example, to disable one of the top and bottom half-bridges, the corresponding PWM signal is set to low by controller 112 which results in the corresponding output SW_0 or SW_1 also being set to low with no transitioning between low and high states. For example, as shown in FIG. 8, PWM_1 is set to low which results in PWM_1_UG being set to low and PWM_1_UG being set to high, e.g., 5V and the corresponding output SW_1 being set to low.

The configuration of AFE 300 allows controller 112 to control and operate power driver 114 using two PWM signals, e.g., PWM_0 and PWM_1, with each PWM signal controlling one half-bridge of AFE 300 and both PWM signals together controlling the full-bridge operation. The two PWM signals allow controller 112 to control not only the frequency of the power output from coil TX for FSK messaging but to also to control the duty cycle and phase shift of the power output. Full-bridge operation of power driver 114 is enabled for AFE 300 by using both PWM signals together and dead time circuits 202 and 206 and ZVS 208 are utilized to automatically control the dead time optimization of SW_0 and SW_1. The controller 112 is configured to transition between half-bridge and full-bridge operation by disabling or setting one of the PWM signals to a low value such as, e.g., 0V.

Figure 9:
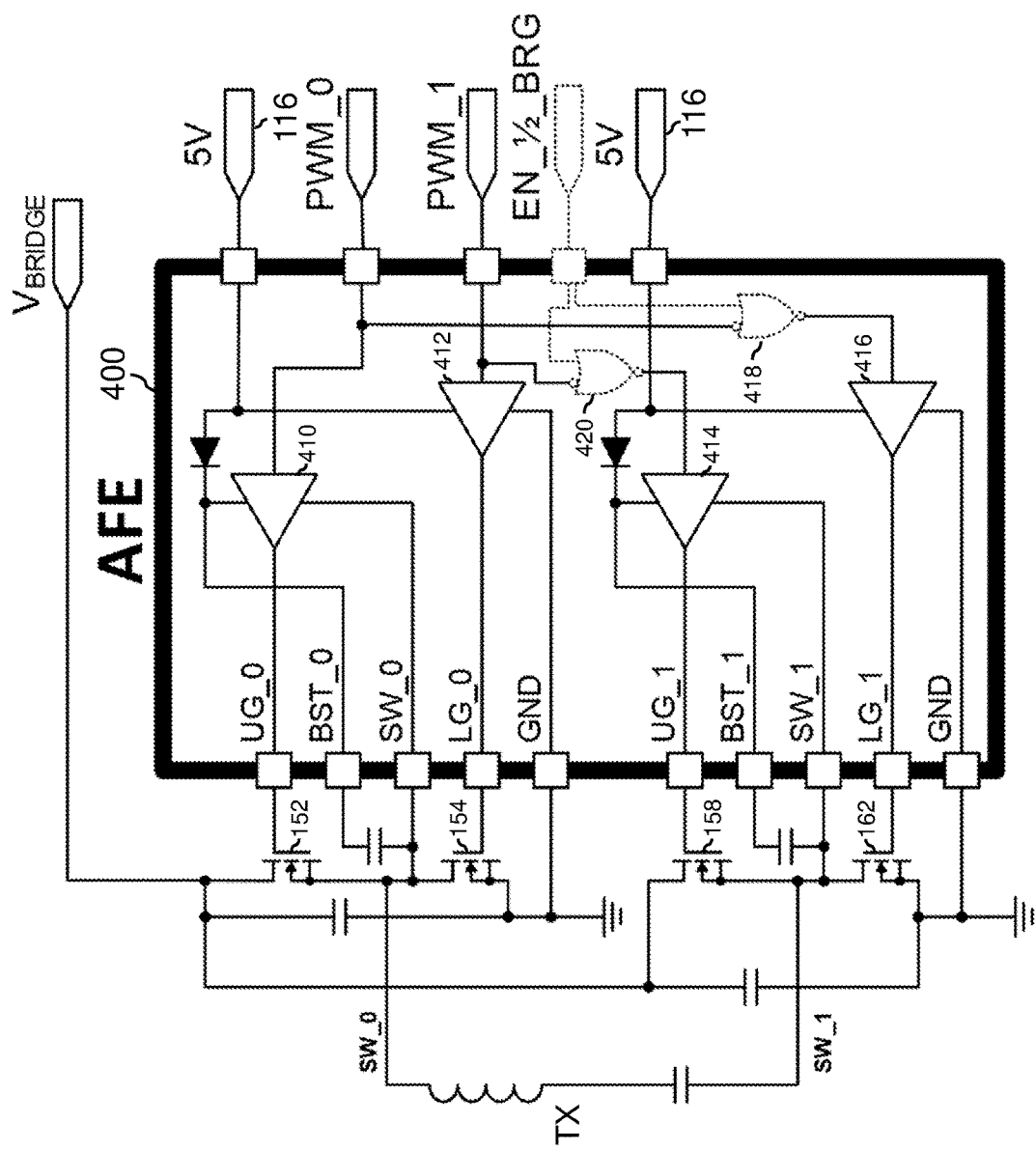
FIG. 9 is a circuit diagram illustrating an example AFE of the transmitter of FIG. 2 according to another embodiment.
Figure 11:
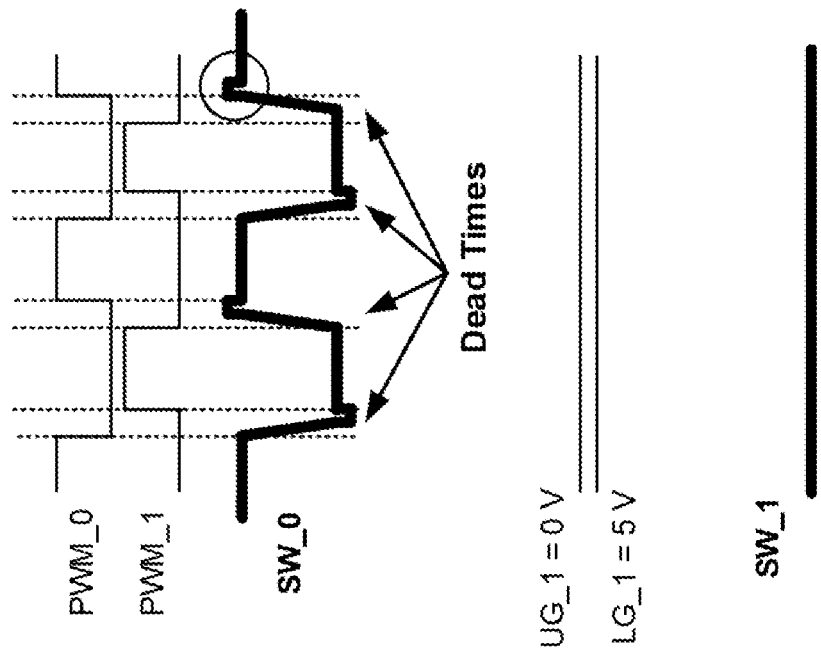
FIG. 11 is a diagram of example waveforms of the AFE of FIG. 9 in a half-bridge mode according to an embodiment.

Referring now to FIG. 9, an example AFE 400 according to an embodiment of AFE 150 will now be described. AFE 400 receives power supplies 116, e.g., 5V power supplies or other voltages, and two PWM signal, PWM_0 and PWM_1, as inputs. In this embodiment, PWM_0 is fed to MOSFET drivers 410 and 416 to control outputs UG_0 and LG_1 and PWM_1 is fed to MOSFET drivers 412 and 414 to control outputs UG_1 and LG_0. PWM_0 and PWM_1 are utilized together by controller 112 to control each half-bridge of AFE 400 during full-bridge or half-bridge modes of operation. For example, in this embodiment, PWM_0 is used by controller 112 to control the operation and activation of MOSFETs 152 and 162 while PWM_1 is used by controller 112 to control the operation and activation of MOSFETs 154 and 158. In this embodiment, controller 112 is configured to control the dead time of SW_0 and SW_1 via PWM_0 and PWM_1.

Figure 10:
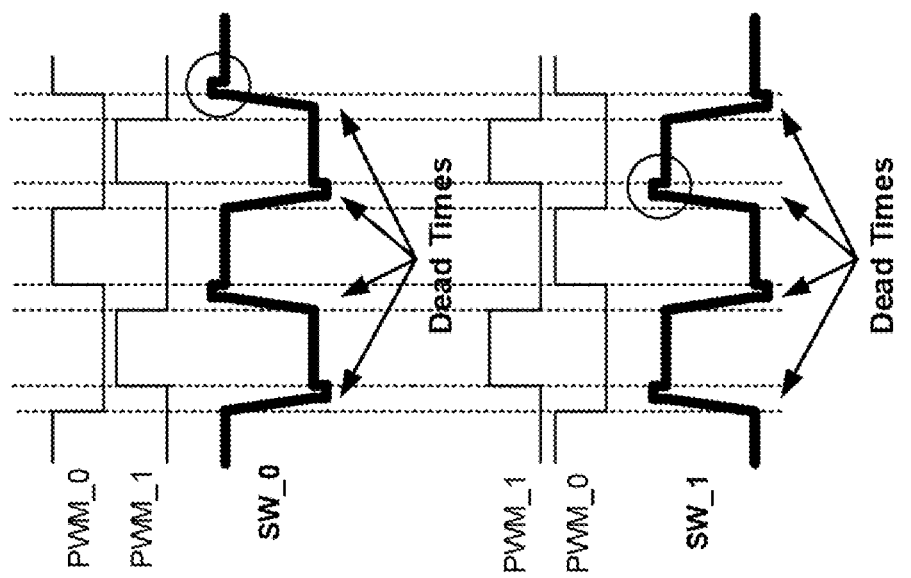
FIG. 10 is a diagram of example waveforms of the AFE of FIG. 9 in a full-bridge mode according to an embodiment.

As shown in FIG. 10, for example, PWM_0 and PWM_1 alternate between low and high with their respective rising and falling edges being spaced apart by controller 112 to optimize the dead times of SW_0 and SW_1. FIG. 10 shows a 50% duty cycle with a 180-degree phase shift between SW_0 and SW_1. Any other duty cycle may alternatively be used.

In some embodiments AFE 400 also receives EN_½_BRG from controller 112. EN_½_BRG feeds into an OR gate 418 disposed between PWM_0 and MOSFET driver 416 and an OR gate 420 disposed between PWM_1 and MOSFET driver 414. In this embodiment, PWM_0 is inverted before entering OR gate 418 and the output of OR gate 418 is also inverted. Similarly, PWM_1 is inverted before entering OR gate 420 and the output of OR gate 418 is also inverted. When EN_½_BRG is enabled, the bottom half-bridge of AFE 400 is disabled, e.g., because the output of each OR gate 418 and 420 is high but gets inverted to a low signal such that both MOSFET driver 414 and MOSFET driver 416 will output low signals, for example in FIG. 11. When EN_½_BRG is disabled, the bottom half-bridge of AFE 400 is enabled with PWM_0 and PWM_1 simply passing through the OR gates 418 and 420, e.g., as shown in FIG. 10.

Figure 12:
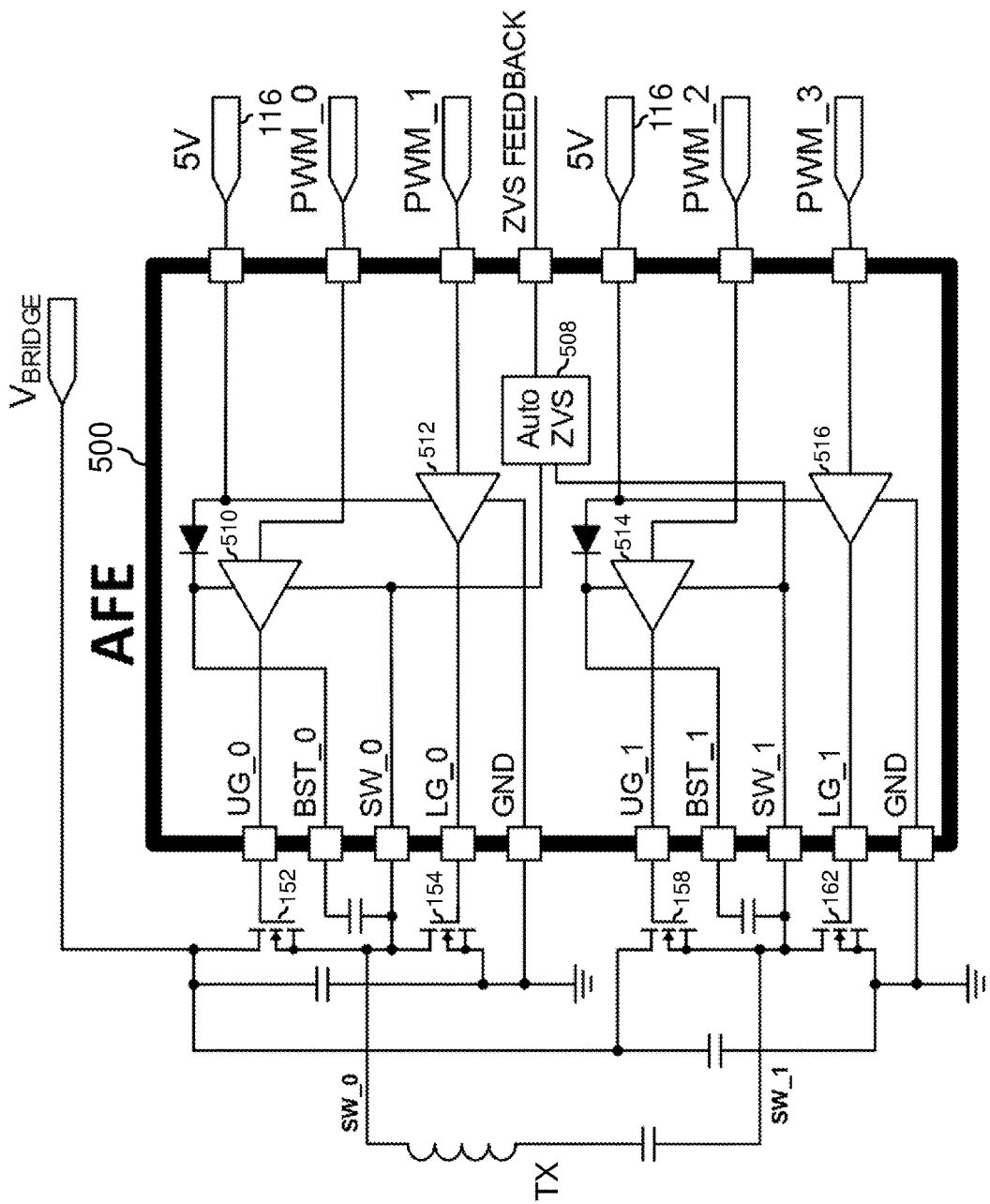
FIG. 12 is a circuit diagram illustrating an example AFE of the transmitter of FIG. 2 according to another embodiment.

In some embodiments, AFE 400 may also comprise a ZVS circuit that outputs its feedback signal to controller 112 instead of a dead time circuit, for example, as shown in FIG. 12.

The configuration of AFE 400 allows controller 112 to control and operate power driver 114 using two PWM signals, e.g., PWM_0 and PWM_1, for both full-bridge and half-bridge operations. The two PWM signals allow controller 112 to control the frequency of the power output from coil TX for FSK messaging and to control the dead times of SW_0 and SW_1. The use of the EN_½_BRG signal allows controller 112 to enable and disable the half-bridge mode of operation independently of the PWM signals. In this embodiment, when operating in the half-bridge mode of operation, controller 112 is also configured to control the duty cycle of the power output by coil TX. For example, since each PWM signal independently controls one MOSFET of the active half-bridge, e.g., MOSFETs 152 and 154 of the top half-bridge, but are not needed to control the opposite MOSFETs of the other half-bridge, e.g., MOSFETS 158 and 162 of the bottom half-bridge, the PWM signals may be manipulated to control the duty cycle by controller 112. It is important to note that dead time, i.e., the period of time when both PWM_0 and PWM_1 are low, may be controlled in a case where the duty cycles of PWM_0 and PWM_1 are 50% or less.

Referring now to FIG. 12, an example AFE 500 according to an embodiment of AFE 150 will now be described. AFE 500 receives power supplies 116, e.g., 5V power supplies or other voltages, and four PWM signal, PWM_0, PWM_1, PWM_2 and PWM_3, as inputs. In this embodiment, PWM_0 is fed to MOSFET driver 510 to control output UG_0, PWM_1 is fed to MOSFET driver 512 to control output UG_1, PWM_2 is fed to MOSFET driver 514 to control output UG_1 and PWM_4 is fed to MOSFET driver 516 to control output LG_1. PWM_0, PWM_1, PWM_2 and PWM_3 are utilized together by controller 112 to control AFE 500 during full-bridge or half-bridge modes of operation. For example, in this embodiment, PWM_0 is used by controller 112 to control the operation and activation of MOSFET 152, PWM_1 is used by controller 112 to control the operation and activation of MOSFET 154, PWM_2 is used by controller 112 to control the operation and activation of MOSFET 158 and PWM_3 is used by controller 112 to control the operation and activation of MOSFET 162. In this embodiment, controller 112 is configured to control the dead time of SW_0 and SW_1 via PWM_0, PWM_1, PWM_2 and PWM_3, e.g., using feedback from a ZVS circuit 508. In other embodiments, dead time circuits such as, e.g., dead time circuits 202 and 206 (FIG. 3), may alternatively be utilized to control the dead time where, for example, each PWM signal may have a corresponding dead time circuit that outputs only one of the delayed outputs.

Figure 13:
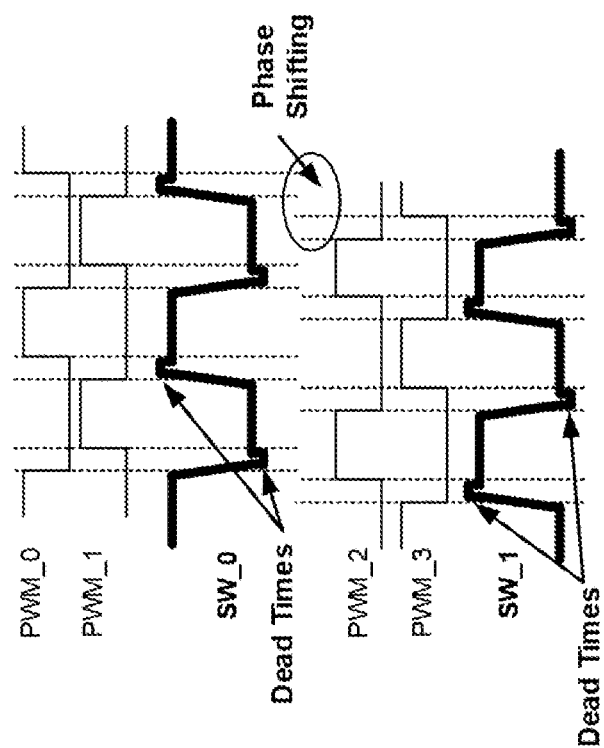
FIG. 13 is a diagram of example waveforms of the AFE of FIG. 12 in a full-bridge mode according to an embodiment.

As shown in FIG. 13, PWM_0 and PWM_1 alternate between low and high with their respective rising and falling edges being spaced apart by controller 112 to optimize the dead times of SW_0. Similarly, PWM_2 and PWM_3 alternate between low and high with their respective rising and falling edges being spaced apart by controller 112 to optimize the dead times of SW_1. FIG. 13 shows a 50% duty cycle with a phase shift between SW_0 and SW_1 that is not limited to only 180 degrees. Any other duty cycle or phase shift may alternatively be used, e.g., by adjusting PWM_0, PWM_1, PWM_2 and PWM_3.

Figure 14:
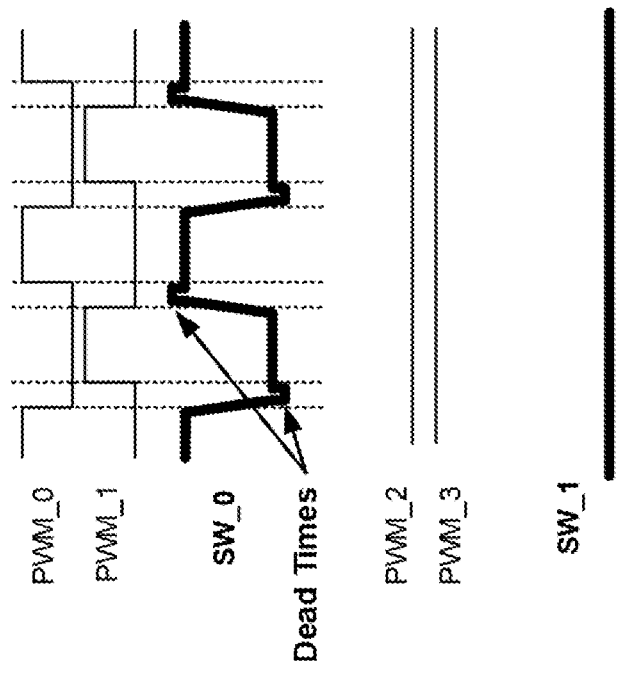
FIG. 14 is a diagram of example waveforms of the AFE of FIG. 12 in a half-bridge mode according to an embodiment.

In this embodiment, controller 112 is configured to enable or disable each half-bridge of AFE 500 using a combination of PWM_0 and PWM_1 or a combination of PWM_2 and PWM_3 respectively. For example, to disable one of the top and bottom half-bridges, the corresponding PWM signals are set to low and high, respectively, by controller 112 which results in the corresponding output SW_0 or SW_1 also being set to low with no transitioning between low and high states. For example, as shown in FIG. 14, PWM_2 is set to low and PWM_3 is set to high which results in the corresponding output SW_1 being set to low.

In some embodiments, AFE 500 also comprises a ZVS circuit 508 that outputs a feedback signal to controller 112. ZVS circuit 508 operates in a similar manner to ZVS circuit 208 except that the output signal, e.g., ZVS FEEDBACK, is provided to controller 112 instead of a dead time circuit. Controller 112 is configured to delay the rising edges of one or more of PWM_0, PWM_1, PWM_2 and PWM_3 based on ZVS FEEDBACK in a similar manner to dead time circuits 202 and 206.

The configuration of AFE 500 allows controller 112 to control and operate power driver 114 using four PWM signals, e.g., PWM_0, PWM_1, PWM_2 and PWM_3 for both full-bridge and half-bridge operations. The use of four PWM signals allows controller 112 to control the frequency of the power output from coil TX for FSK messaging. The use of four PWM signals also allows controller 112 to control the dead time of SW_0 and SW_1 directly, e.g., by delaying the rising edges of one or more of the PWM signals according to the ZVS FEEDBACK signal received from ZVS circuit 508. Because separate PWM signals are used for each half-bridge, controller 112 is also configured to shift the phase of SW_1 relative to SW_0 when operating in full-bridge mode, e.g., by adjusting one or both of the corresponding PWM signals. In addition, the duty cycle of the power output from coil TX may be adjusted directly by controller 112 by adjusting the duty cycles of one or more of the four PWM signals.

Figure 15:
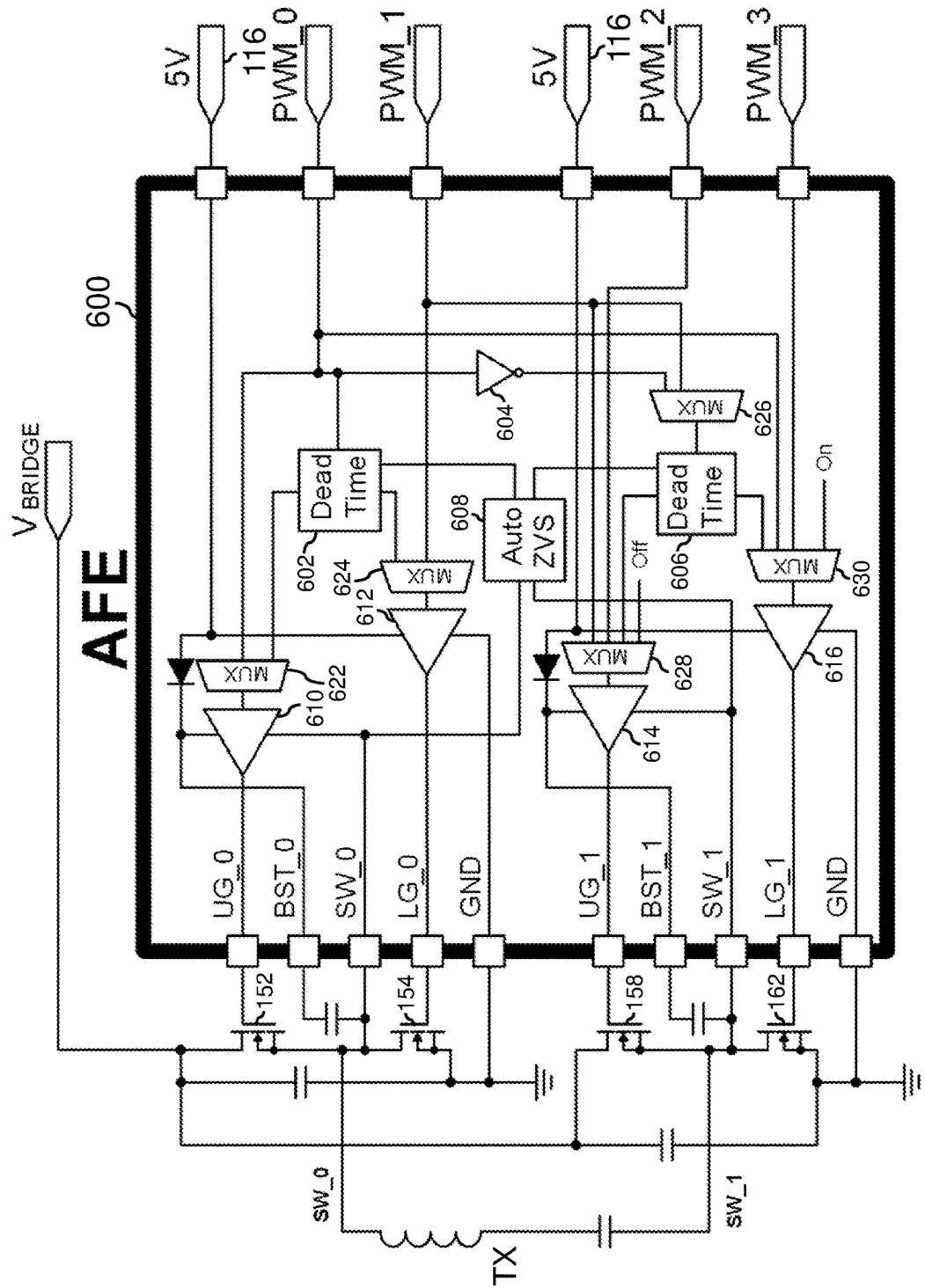
FIG. 15 is a circuit diagram illustrating an example AFE of the transmitter of FIG. 2 according to another embodiment.

Referring now to FIG. 15, an example AFE 600 according to an embodiment of AFE 150 will now be described. AFE 600 receives power supplies 116, e.g., 5V power supplies or other voltages, and one or more of PWM signals PWM_0, PWM_1, PWM_2 and PWM_3 as inputs.

In this embodiment, PWM_0 is fed to a multiplexer (MUX) 622 that feeds into MOSFET driver 610 to control output UG_0. PWM_0 also feeds into a dead time circuit 602 which outputs a signal such as, e.g., PWM_0_UG (FIG. 3), to MUX 622. Dead time circuit 602 also outputs a signal such as, e.g., PWM_0_LG (FIG. 3), to a MUX 624 that feeds into MOSFET driver 612 to control output LG_0.

PWM_0 also is fed into an inverter 604 and the inverted signal is fed into a MUX 626 that feeds into a dead time circuit 606 which outputs a signal, e.g., PWM_1_UG (FIG. 3), to a MUX 628 that feeds into MOSFET driver 614 to control output UG_1. Dead time circuit 606 also outputs a signal such as, e.g., PWM_1_LG (FIG. 3), to a MUX 630 that feeds into MOSFET driver 616 to control output LG_1.

PWM_1 is fed into MUX 624 to control output LG_0, into MUX 628 to control output UG_1, and into dead time circuit 606 to control both outputs UG_1 and LG_1.

PWM_2 is fed into MUX 628 to control output UG_1 and PWM_3 is fed into MUX 630 to control output LG_1.

AFE 600 is configured to control and operate coil TX in a single PWM mode, e.g., similar to AFE 200, in a first dual PWM mode, e.g., similar to AFE 300, in a second dual PWM mode, e.g., similar to AFE 400, and in a quad PWM mode, e.g., similar to AFE 500. For example, MUXs 622, 624, 626, 628 and 630 may be configured or controllable to select a particular input according to the mode of operation for AFE 600. In some embodiments, AFE 600 may be configured to determine which PWM signals are active and to configured MUXs 622, 624, 626, 628 and 630 accordingly for the corresponding PWM mode of operation.

As an example, if only PWM_0 is active or if AFE 600 is set to the single PWM mode, MUX 622 may be configured to use the signal output from dead time circuit 602, MUX 624 may be configured to use the signal output from dead time circuit 602, MUX 626 may be configured to use the signal output from inverter 604, MUX 628 may be configured to use the signal output from dead time circuit 606 and MUX 630 may be configured to use the signal output from dead time circuit 606. In the single PWM mode, AFE 600 functions in a similar manner to AFE 200 (FIG. 3). In addition, half-bridge mode may be enabled setting MUX 628 to use an "off" signal, e.g., a low signal or 0V signal, and setting MUX 630 to use an "on" signal, e.g., a high signal or 5V signal.

If only PWM_0 and PWM_1 are active or if AFE 600 is set to the first dual PWM mode, MUX 622 may be configured to use the signal output from dead time circuit 602, MUX 624 may be configured to use the signal output from dead time circuit 602, MUX 626 may be configured to use the signal from PWM_1, MUX 628 may be configured to use the signal output from dead time circuit 606 and MUX 630 may be configured to use the signal output from dead time circuit 606. In the first dual PWM mode, AFE 600 functions in a similar manner to AFE 300 (FIG. 6). In addition, half-bridge mode may be enabled setting MUX 628 to use an "off" signal, e.g., a low signal or 0V signal, and setting MUX 630 to use an "on" signal, e.g., a high signal or 5V signal. Alternatively, in the first dual PWM mode, PWM_1 may be set to low, e.g., 0V, to enable half-bridge mode in a similar manner to that described above for AFE 300.

If only PWM_0 and PWM_1 are active or if AFE 600 is set to the second dual PWM mode, MUX 622 may be configured to use the signal from PWM_0, MUX 624 may be configured to use the signal from PWM_1, MUX 628 may be configured to use the signal from PWM_1 and MUX 630 may be configured to use the signal from PWM_0. In the second dual PWM mode, AFE 600 functions in a similar manner to AFE 400 (FIG. 9). In addition, half-bridge mode may be enabled setting MUX 628 to use an "off" signal, e.g., a low signal or 0V signal, and setting MUX 630 to use an "on" signal, e.g., a high signal or 5V signal.

If all four of PWM_0, PWM_1, PWM_2 and PWM_3 are active or if AFE 600 is set to the quad PWM mode, MUX 622 may be configured to use the signal from PWM_0, MUX 624 may be configured to use the signal from PWM_1, MUX 628 may be configured to use the signal from PWM_2 and MUX 630 may be configured to use the signal from PWM_3. In the quad PWM mode, AFE 600 functions in a similar manner to AFE 500 (FIG. 12). In addition, half-bridge mode may be enabled setting MUX 628 to use an "off" signal, e.g., a low signal or 0V signal, and setting MUX 630 to use an "on" signal, e.g., a high signal or 5V signal. Alternatively, half-bridge mode may be enabled by setting PWM_2 to a low signal, e.g., 0V, and seeing PWM_3 to a high signal, e.g., 5V.

When dead time circuits 602 and 606 are active, a ZVS circuit 608 may be utilized to optimize the dead time and set the rising edges of the outputs signals in a similar manner to ZVS circuit 208. In some embodiments, ZVS circuit 608 may alternatively provide feedback to controller 112.

The configuration of AFE 600 allows controller 112 to control and operate power driver 114 using any of the PWM modes mentioned above, e.g., the single PWM mode, the first dual PWM mode, the second dual PWM mode, and the quad PWM mode. For example, in some embodiments, the particular PWM mode that is used may be dependent on how many pins of controller 112 are available for use in controlling and operating power driver 114. In some embodiments, the particular PWM mode that is used may be dependent on what functionality is needed for a specific application, e.g., frequency control, duty cycle control, phase shift control, dead time control, full-bridge and half-bridge operation, etc.

Figure 16:
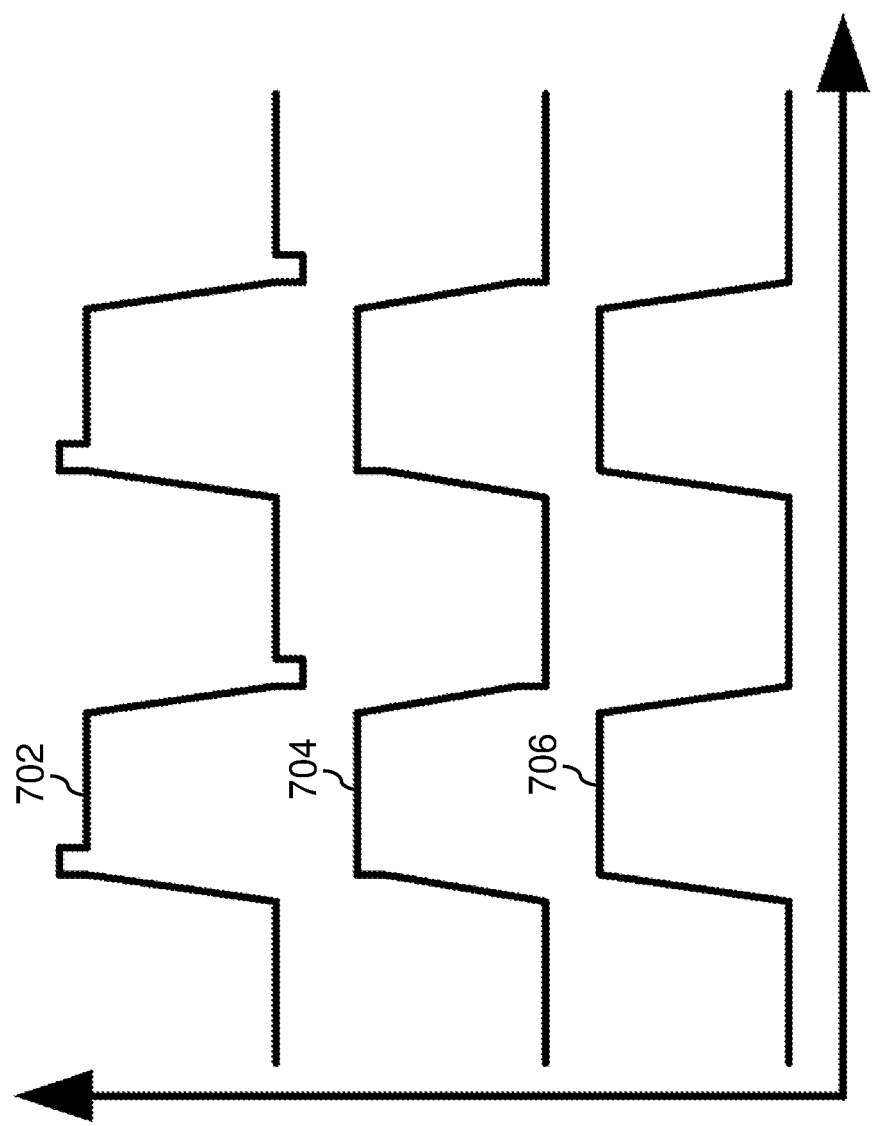
FIG. 16 is a diagram of example waveforms illustrating dead time optimization according to an embodiment.

With reference now to FIGS. 16-21, the function of ZVS circuits 208, 308, 508 and 608 will now be described. FIG. 16 shows three waveforms 702, 704 and 706 that illustrate an example use of dead time optimization on the SW_0 and SW_1 signals. Waveform 702 illustrates an example signal without dead time optimization showing the clamping effect from the MOSFETs. As dead time is optimized, the clamping effect is reduced, e.g., as shown in waveform 704, with clamping effect eventually being mitigated as seen in waveform 706.

Figure 17:
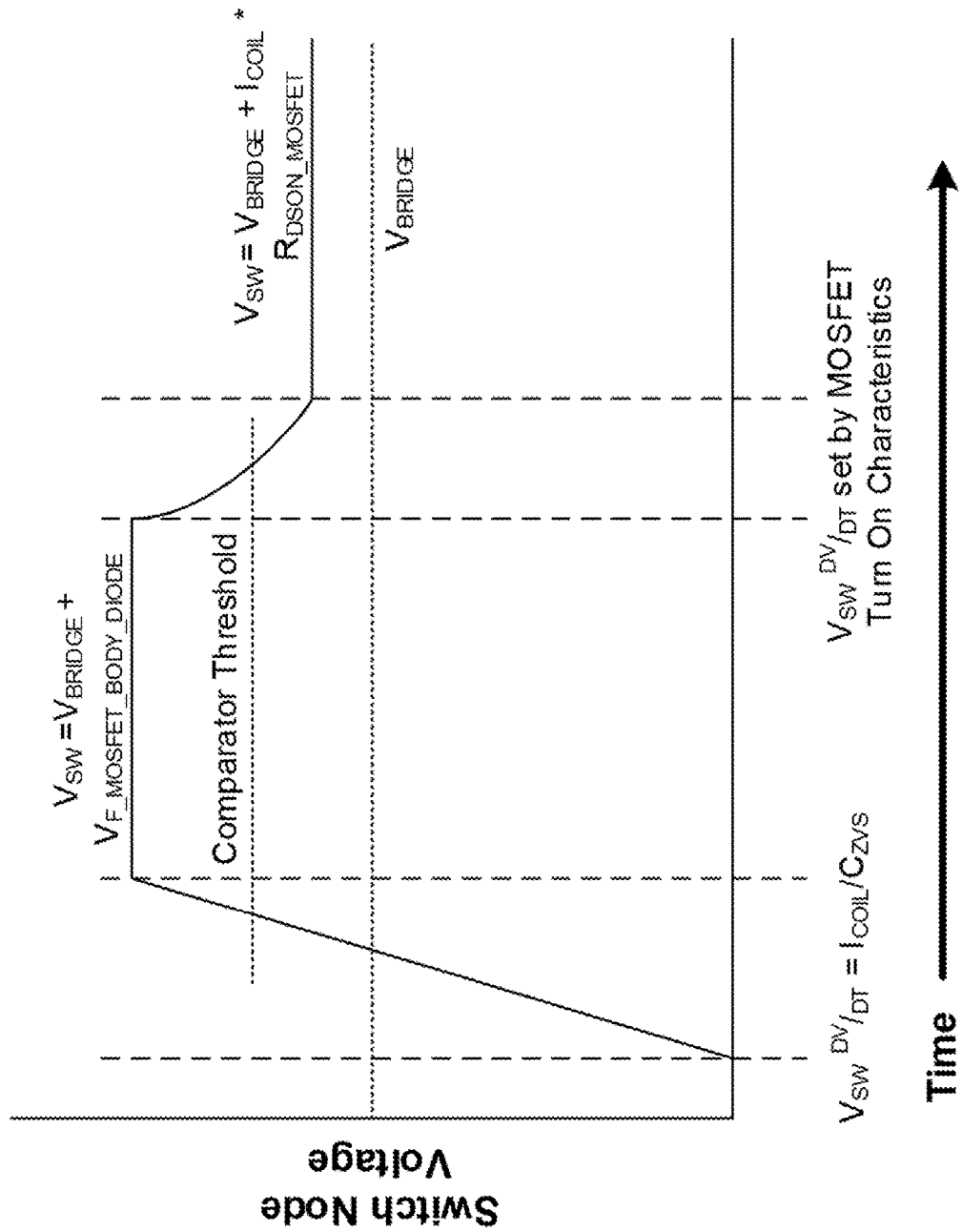
FIG. 17 is a diagram of an example waveform illustrating the function of a zero-voltage switching (ZVS) circuit according to an embodiment.

With reference now to FIG. 17, the ZVS circuit is configured to activate the UG and LG MOSFETs such that the final VDS is equal to 0V. If the dead time is too short and the MOSFETs are activated too early hard switching occurs. If the dead time is too long the body diodes of the MOSFETs will conduct, causing power loss, and hard switching will also occur. In the latter case the hard switching is limited to the body diode voltage while in the former case the hard switching could be as large as the input voltage.

In some embodiments, the ZVS circuit comprises a comparator threshold that is monitored for the SW output on each rising edge. When the rising edge of the SW output exceeds the comparator threshold, the dead time delay is reduced for the next rising edge. If the rising edge of the SW output does not exceed the comparator threshold, the dead time delay is increased for the next rising edge. The magnitude of the decrease or increase may be predetermined or may be varied depending on an amount that the comparator threshold is exceeded or not exceeded. In this embodiment, the falling edge is aligned with the clock. This ZVS circuit continuously corrects the dead time delay based on feedback such that over time the dead time delay may be optimized.

In some embodiments, the dead time delay may be static and the comparator threshold may alternatively be increased when the rising edge of the SW output exceeds the comparator threshold and decreased when the rising edge of the SW output does not exceed the comparator threshold. For example, the comparator may be adjusted during a calibration process of the dead time of the SW output signals. In some embodiments, multiple comparator thresholds may be utilized to provide a range within which the dead time delay is acceptable, e.g., a minimum comparator threshold and a maximum comparator threshold. For example, if the rising edge of the SW output does not exceed the minimum comparator threshold, the dead time delay may be increased, if the rising edge of the SW output exceeds the minimum comparator threshold but does not exceed the maximum comparator threshold the dead time delay remains the same, and if the rising edge of the SW output exceeds the maximum comparator threshold the dead time delay is reduced.

By using a servo feedback loop from the SW outputs and comparing the feedback to the comparator thresholds, the ZVS circuit is able to identify where the peak of the SW outputs are located and to adjust and optimize the amount of dead time before activation of the next MOSFET accordingly.

To mitigate the effect of jitter or noise, the ZVS circuits are configured to utilize a digital delay for the dead time instead of an analog delay which is prone to having jitter. However instead of using an internal oscillator of the AFE 150 which may be prone to jitter or noise due to the power electronics in the integrated circuit, a digital clock of the AFE 150 that is frequency locked, phase locked, or both frequency and phase locked to an external clock signal provided by the controller 112 may instead be used by the ZVS circuits. Using such a digital clock mitigates jitter in a manner that satisfies the requirements of the QI standard FSK operations.

Figure 18:
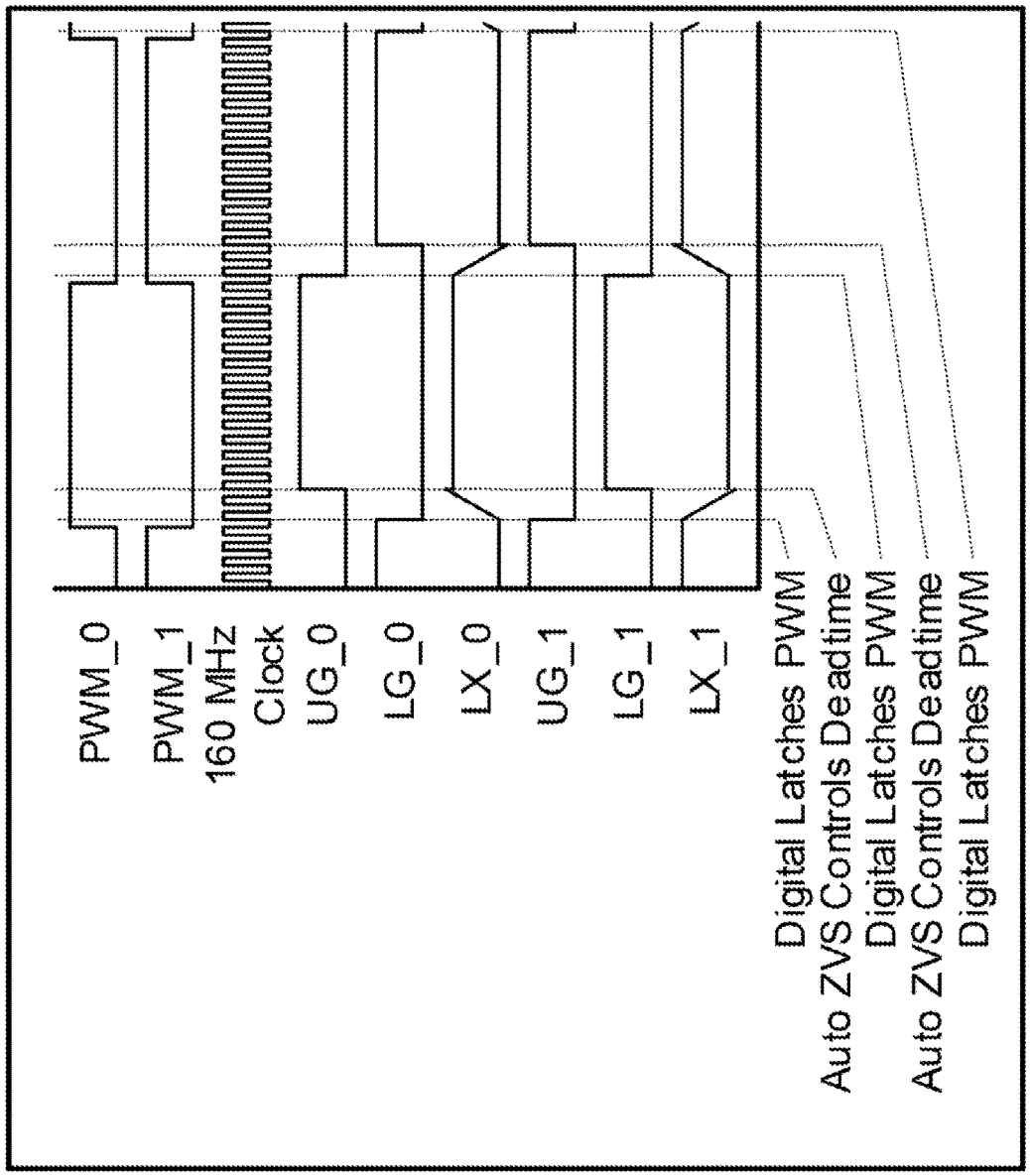
FIG. 18 is a diagram of example waveforms illustrating dead time optimization according to an embodiment.

FIG. 18 shows an example scenario of a 50% duty cycle at 100% power having a 180-degree phase shift for a dual PWM mode using PWM_0 and PWM_1 as input signals. As seen in FIG. 18, the PWM signals are latched to the clock signal and the ZVS circuit selects the dead time in internal clock ticks for activating the complementary UG and LG gate drive signals to drive the outputs LX_0 and LX_1.

Figure 19:
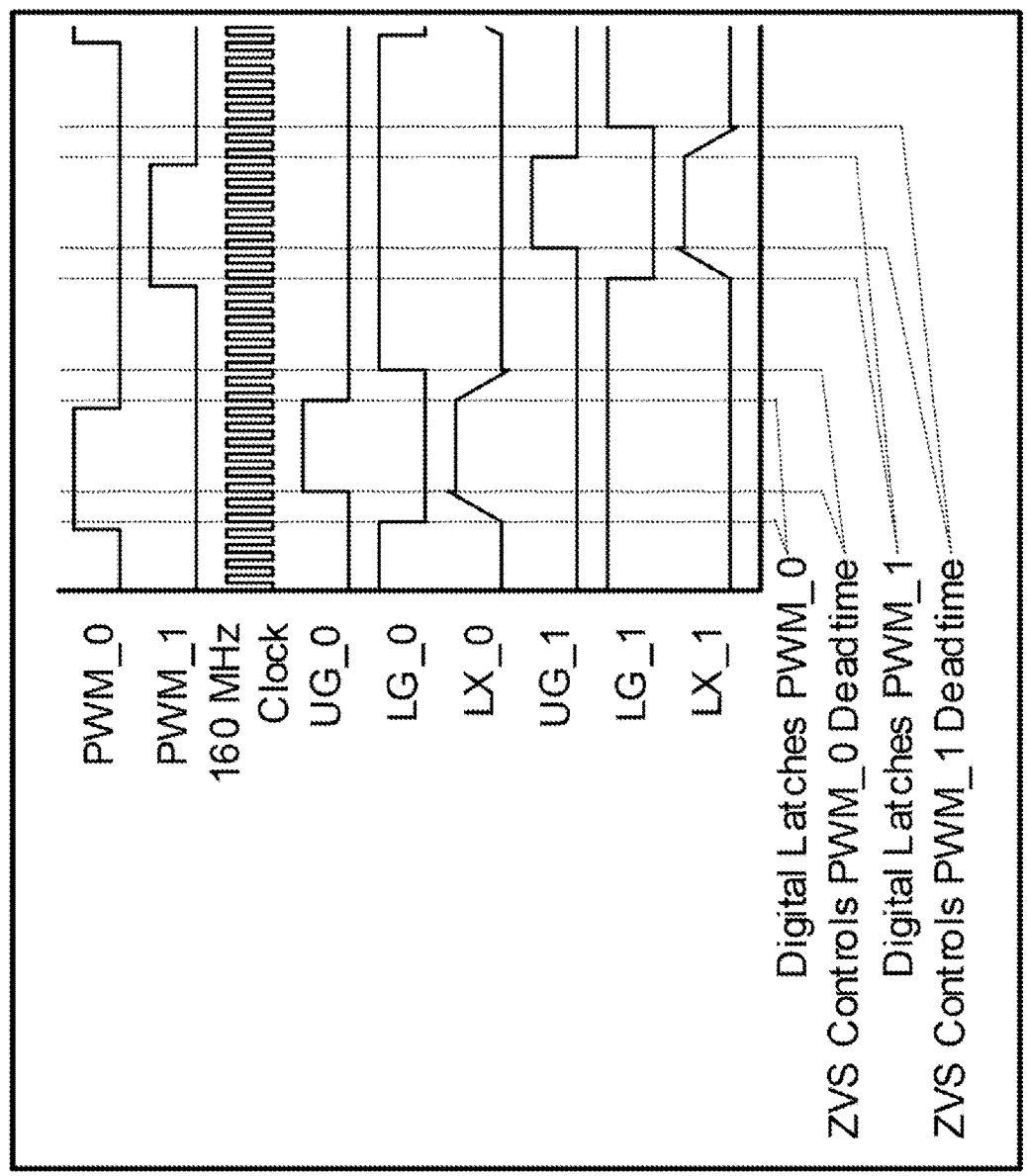
FIG. 19 is a diagram of example waveforms illustrating dead time optimization according to another embodiment.

FIG. 19 shows an example scenario of a 25% duty cycle at 50% power having a 180-degree phase shift with a duty cycle operation for a dual PWM mode using PWM_0 and PWM_1. As seen in FIG. 19, the PWM signals are latched to the clock signal and the ZVS circuit selects the dead times in internal clock ticks for activating the complementary UG and LG gate drive signals to drive the outputs LX_0 and LX_1.

Figure 20:
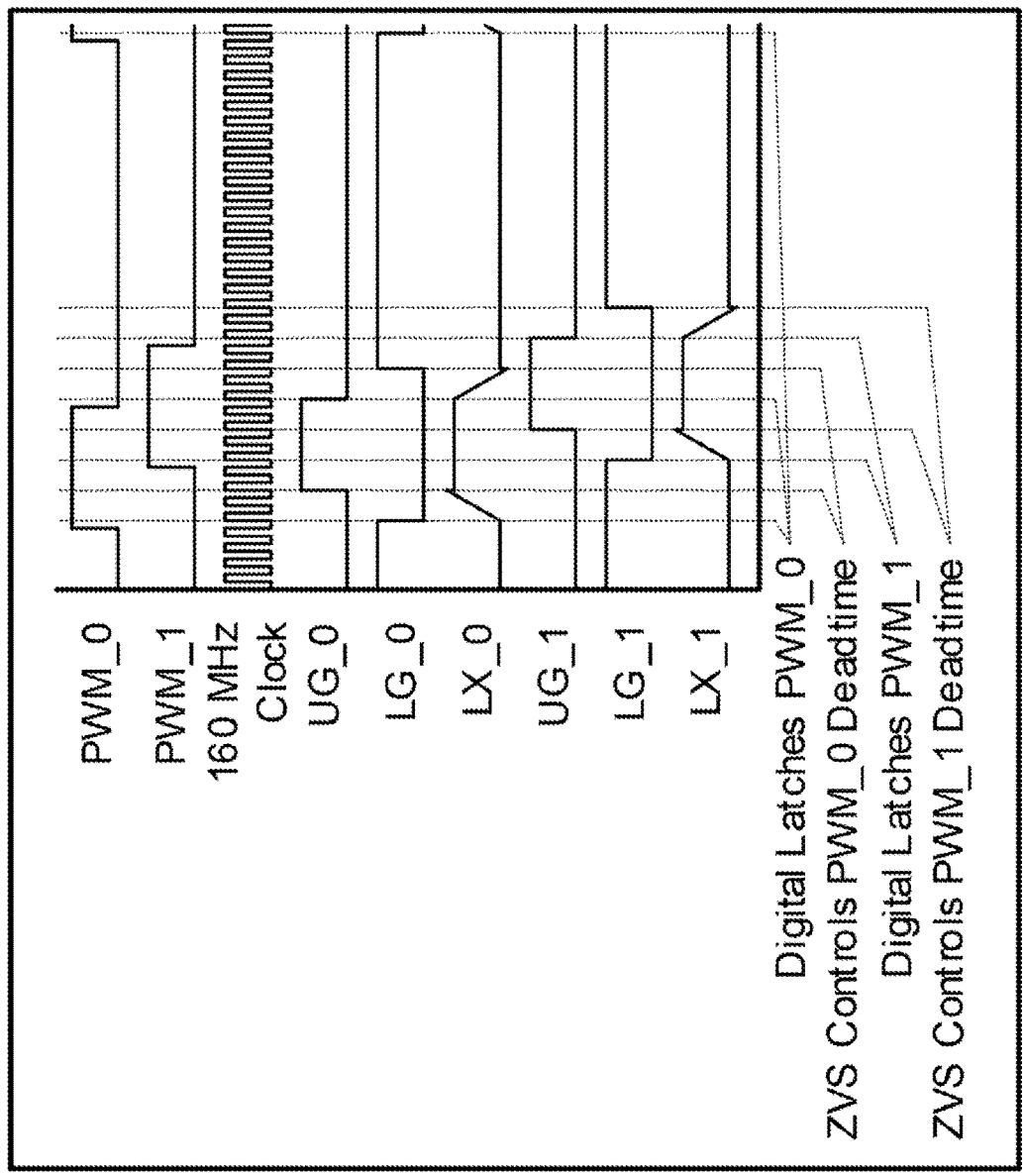
FIG. 20 is a diagram of example waveforms illustrating dead time optimization according to another embodiment.

FIG. 20 shows an example scenario of a 25% duty cycle at 25% power having a 45-degree phase shift with duty cycle and phase shift operations in a dual PWM mode using PWM_0 and PWM_1. As seen in FIG. 20, the PWM signals are offset in phase but latched to the clock signal and the ZVS circuit selects the dead times in internal clock ticks for activating the complementary gate drive signals UG and LG to drive the outputs LX_0 and LX_1.

Figure 21:
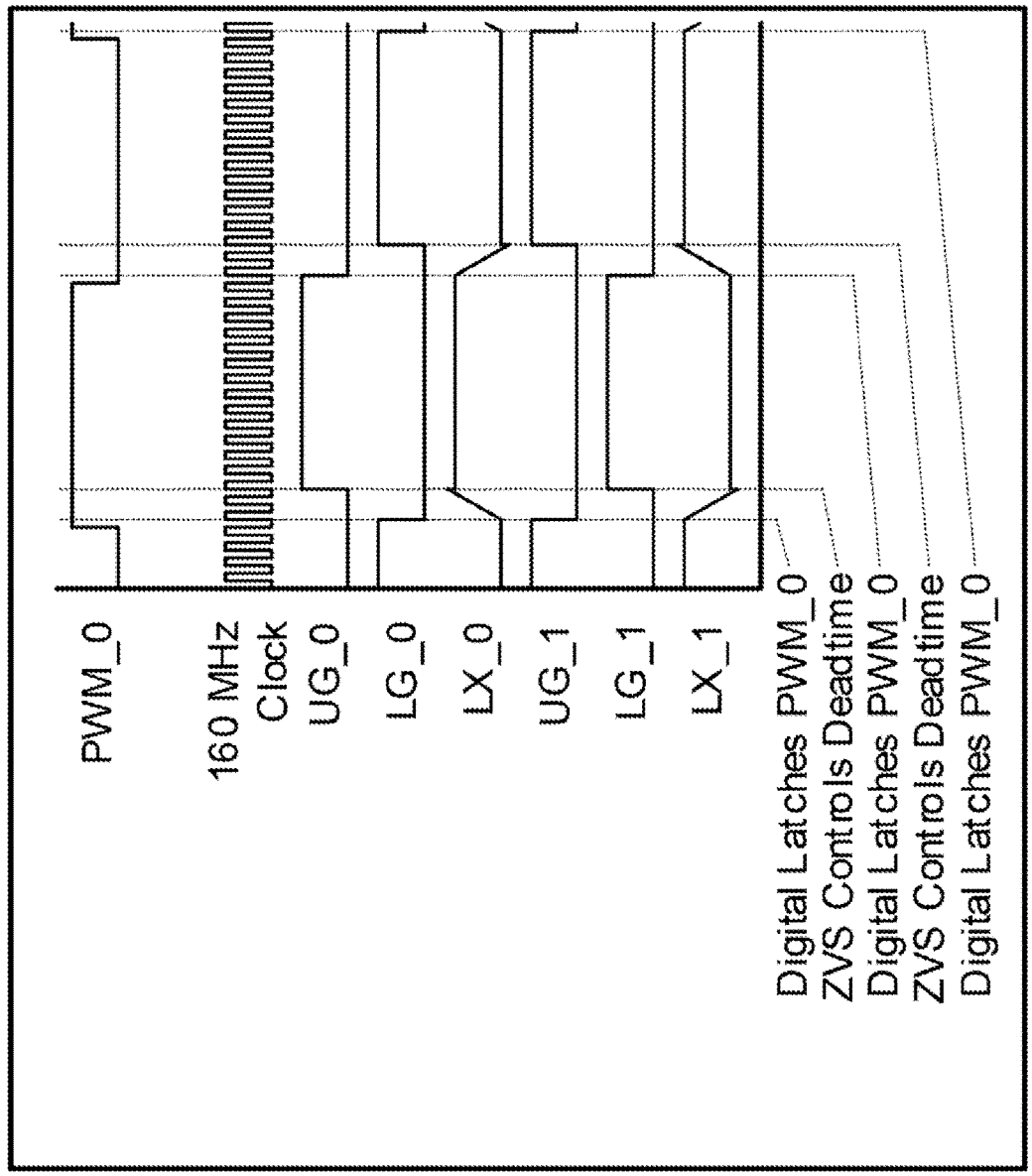
FIG. 21 is a diagram of example waveforms illustrating dead time optimization according to another embodiment.

FIG. 21 shows an example scenario of a 50% duty cycle at 100% power having a 180-degree phase shift in a single PWM mode using PWM_0. As seen in FIG. 21, the PWM signal is latched to the clock signal and the ZVS circuit selects the dead times in internal clock ticks for activating the complementary gate drive signals UG and LG to drive the outputs LX_0 and LX_1.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A wireless power transmitter comprising:
   a first field-effect transistor;
   a second field-effect transistor;
   a coil, the wireless power transmitter being configured to drive the coil based at least in part on activations of the first and second field-effect transistors; and
   an analog front end comprising:
      a first driver corresponding to the first field-effect transistor and being configured to control activation of the first field-effect transistor based at least in part on a pulse-width modulation signal; and
      a second driver corresponding to the second field-effect transistor and being configured to control activation of the second field-effect transistor based at least in part on the pulse-width modulation signal.

2. The wireless power transmitter of claim 1, wherein the pulse-width modulation signal is received unencoded by the analog front end from a controller of the wireless power transmitter.

3. The wireless power transmitter of claim 1, wherein the analog front end further comprises a dead time circuit, the dead time circuit being configured to:
   receive the pulse-width modulation signal as an input;
   output a first rising edge delayed signal to the first driver based on the pulse-width modulation signal, the first rising edge delayed signal having a rising edge that is delayed relative to the pulse-width modulation signal, the first driver being configured to control activation of the first field-effect transistor based at least in part on the first rising edge delayed signal; and output a second rising edge delayed signal to the second driver based on an inversion of the pulse-width modulation signal, the second rising edge delayed signal having a rising edge that is delayed relative to the inversion of the pulse-width modulation signal, the second driver being configured to control activation of the second field-effect transistor based at least in part on the second rising edge delayed signal.

4. The wireless power transmitter of claim 3, wherein the analog front end further comprises a zero-voltage switching circuit that is configured to:

receive feedback from the coil based at least in part on the activations of the first and second field-effect transistors; and provide at least one feedback signal to the dead time circuit based at least in part on the received feedback, the at least one feedback signal indicating an amount to delay for the rising edges of the first and second rising edge delayed signals.

5. The wireless power transmitter of claim 1, wherein:

the wireless power transmitter further comprises:
 a third field-effect transistor; and
 a fourth field-effect transistor, the wireless power transmitter being configured to drive the coil based at least in part on activations of the first, second, third, and fourth field-effect transistors; and the analog front end further comprises:
 a third driver corresponding to the third field-effect transistor and being configured to control activation of the third field-effect transistor; and
 a fourth driver corresponding to the fourth field-effect transistor and being configured to control activation of the fourth field-effect transistor.

6. The wireless power transmitter of claim 5, wherein:

the third driver is configured to control activation of the third field-effect transistor based at least in part on an inversion of the pulse-width modulation signal; and the fourth driver is configured to control activation of the fourth field-effect transistor based at least in part on the inversion of the pulse-width modulation signal.

7. The wireless power transmitter of claim 6, wherein:

the first and second field-effect transistors correspond to a first half-bridge of the wireless power transmitter;

the third and fourth field-effect transistors correspond to a second half-bridge of the wireless power transmitter;

the analog front end is configured to:
 receive a half-bridge enable signal; and
 to disable the second half-bridge based at least in part on the received half-bridge enable signal.

8. The wireless power transmitter of claim 5, wherein:

the third driver is configured to control activation of the third field-effect transistor based at least in part on a second pulse-width modulation signal; and the fourth driver is configured to control activation of the fourth field-effect transistor based at least in part on the second pulse-width modulation signal.

9. The wireless power transmitter of claim 8, wherein the analog front end further comprises a dead time circuit, the dead time circuit being configured to:

receive the second pulse-width modulation signal as an input;

output a first rising edge delayed signal to the third driver based at least in part on the second pulse-width modulation signal, the first rising edge delayed signal having a rising edge that is delayed relative to the second pulse-width modulation signal, the third driver being configured to control activation of the third field-effect transistor based at least in part on the first rising edge delayed signal; and output a second rising edge delayed signal to the fourth driver based on an inversion of the second pulse-width modulation signal, the second rising edge delayed signal having a rising edge that is delayed relative to the inversion of the second pulse-width modulation signal, the fourth driver being configured to control activation of the fourth field-effect transistor based at least in part on the second rising edge delayed signal.

10. The wireless power transmitter of claim 8, wherein:

the first and second field-effect transistors correspond to a first half-bridge of the wireless power transmitter;

the third and fourth field-effect transistors correspond to a second half-bridge of the wireless power transmitter; and the analog front end is configured to disable one of the first and second half-bridges based at least in part on the corresponding pulse-width modulation signal being set to a value that corresponds to disabling the one of the first and second half-bridges.

11. A wireless power transmitter comprising:

a first field-effect transistor;

a second field-effect transistor;

a third field-effect transistor;

a fourth field-effect transistor;

a coil, the wireless power transmitter being configured to drive the coil based at least in part on activations of the first, second, third and fourth field-effect transistors; and an analog front end comprising:
 a first driver corresponding to the first field-effect transistor and being configured to control activation of the first field-effect transistor;
 a second driver corresponding to the second field-effect transistor and being configured to control activation of the second field-effect transistor;
 a third driver corresponding to the third field-effect transistor and being configured to control activation of the third field-effect transistor; and
 a fourth driver corresponding to the fourth field-effect transistor and being configured to control activation of the fourth field-effect transistor, wherein the activation of at least one of the first field-effect transistor and the fourth field-effect transistor is controlled based at least in part on a first pulse-width modulation signal; and wherein the activation of at least one of the second field-effect transistor and the third field-effect transistor is controlled based at least in part on a second pulse-width modulation signal.

12. The wireless power transmitter of claim 11, wherein the first and second pulse-width modulation signals are received unencoded by the analog front end from a controller of the wireless power transmitter.

13. The wireless power transmitter of claim 11, wherein:

the first and second field-effect transistors correspond to a first half-bridge of the wireless power transmitter;

the third and fourth field-effect transistors correspond to a second half-bridge of the wireless power transmitter;

the analog front end is configured to:
 receive a half-bridge enable signal; and
 to disable the second half-bridge based at least in part on the received half-bridge enable signal.

14. The wireless power transmitter of claim 11, wherein:
the first driver is configured to control activation of the first field-effect transistor based at least in part on the first pulse-width modulation signal;
the second driver is configured to control activation of the second field-effect transistor based at least in part on the second pulse-width modulation signal;
the third driver is configured to control activation of the third field-effect transistor based at least in part on the second pulse-width modulation signal; and
the fourth driver is configured to control activation of the fourth field-effect transistor based at least in part on the first pulse-width modulation signal.

15. The wireless power transmitter of claim 11, wherein:
the first driver is configured to control activation of the first field-effect transistor based at least in part on the first pulse-width modulation signal;
the second driver is configured to control activation of the second field-effect transistor based at least in part on the second pulse-width modulation signal;
the third driver is configured to control activation of the third field-effect transistor based at least in part on a third pulse-width modulation signal; and
the fourth driver is configured to control activation of the fourth field-effect transistor based at least in part on a fourth pulse-width modulation signal.

16. The wireless power transmitter of claim 15, wherein:
the first and second field-effect transistors correspond to a first half-bridge of the wireless power transmitter;
the third and fourth field-effect transistors correspond to a second half-bridge of the wireless power transmitter; and
the analog front end is configured to disable the second half-bridge based at least in part on the third pulse-width modulation signal being set to a low value and the fourth pulse-width modulation signal being set to a high value.

17. The wireless power transmitter of claim 11, wherein:
the first and second pulse-width modulation signals are received by the analog front end from a controller of the wireless power transmitter;
the analog front end further comprises a zero-voltage switching circuit that is configured to:
receive feedback from the coil based at least in part on the activations of at least one of the first, second, third and fourth field-effect transistors; and
provide at least one feedback signal to the controller based at least in part on the received feedback, the controller being configured to delay a rising edge of at least one of the first and second pulse-width modulation signals based at least in part on the at least one feedback signal.

18. A wireless power transmitter comprising:
a coil;
a plurality of field-effect transistors that are configured to drive the coil;
an analog front end that is configured to control activations of the plurality of field-effect transistors; and
a controller that is configured to provide an unencoded pulse-width modulation signal to the analog front end, the analog front end being configured to control the activation of at least one of the field-effect transistors based at least in part on the unencoded pulse-width modulation signal.

19. The wireless power transmitter of claim 18, wherein:
the plurality of field-effect transistors comprises four field-effect transistors; and
the analog front end is configured to control the activation of each of the four field-effect transistors based at least in part on the unencoded pulse-width modulation signal.

20. The wireless power transmitter of claim 19, wherein:
two of the four field-effect transistors correspond to a first half-bridge of the wireless power transmitter and the remaining two of the four field-effect transistors correspond to a second half-bridge of the wireless power transmitter;
the controller is configured to provide a half-bridge enable signal to the analog front end; and
the analog front end is configured to enter a half-bridge mode of operation based at least in part on the half-bridge enable signal, the analog front end, when in the half-bridge mode of operation, being configured to disable the second half-bridge.

\* \* \* \* \*